(12) United States Patent
Trummer et al.

(10) Patent No.: US 9,625,575 B2
(45) Date of Patent: Apr. 18, 2017

(54) DISTANCE MEASURING APPARATUS AND METHOD FOR CALCULATING A DISTANCE IN A CONDUCTING STRUCTURE

(71) Applicant: ASTYX GmbH, Ottobrunn (DE)

(72) Inventors: Guenther Trummer, Baiersdorf (DE); Ralf Gehring, Feldkirchen (DE)

(73) Assignee: ASTYX GmbH, Ottobrunn (DE)

( * ) Notice: Subject to any disclaimer, the term of this patent is extended or adjusted under 35 U.S.C. 154(b) by 0 days.

(21) Appl. No.: 15/049,764

(22) Filed: Feb. 22, 2016

(65) Prior Publication Data

US 2016/0245910 A1 Aug. 25, 2016

Related U.S. Application Data

(63) Continuation of application No. 13/129,391, filed as application No. PCT/EP2009/008103 on Nov. 13, 2009, now Pat. No. 9,267,823.

(30) Foreign Application Priority Data

Nov. 14, 2008 (DE) .................. 10 2008 057 298
Dec. 9, 2008 (DE) .................. 10 2008 061 227

(51) Int. Cl.
*G01R 27/04* (2006.01)
*G01S 13/38* (2006.01)
(Continued)

(52) U.S. Cl.
CPC .......... *G01S 13/38* (2013.01); *F15B 15/2869* (2013.01); *G01D 5/48* (2013.01); *G01S 7/025* (2013.01); *G01S 13/88* (2013.01)

(58) Field of Classification Search
CPC ....... F15B 15/2869; G01D 5/48; G01S 7/025; G01S 13/88
(Continued)

(56) References Cited

U.S. PATENT DOCUMENTS 3,737,812 A 6/1973 Gaudio et al.
3,742,506 A * 6/1973 Wilkinson ............... H01Q 3/28
 342/362
(Continued)

FOREIGN PATENT DOCUMENTS

DE 198 33 220 A1 6/1999
DE 102 05 904 A1 8/2003
(Continued)

OTHER PUBLICATIONS

International Search Report (German language), Int'l App. No. PCT/EP2009/008103, Int'l Filing Date: Nov. 13, 2009, Date of Completion of Search: Oct. 5, 2010, Date of Mailing: Oct. 12, 2010, (17) pgs.

*Primary Examiner* — Patrick Assouad
*Assistant Examiner* — Demetrius Pretlow
(74) *Attorney, Agent, or Firm* — Fish & Richardson P.C.

(57) ABSTRACT

A distance measuring apparatus and method for calculating a distance in a conducting structure are provided. One distance measuring apparatus provides for calculating a distance between a reflection body in a conducting structure and an injection point provided on an end section of the conducting structure for electromagnetic waves is provided. The distance measuring apparatus includes a transmitting and receiving device with a conduction cross-over provided at the injection point for the coaxially-inductive coupling of the transmitting and receiving device to the conducting structure in order to inject an electromagnetic wave into the conducting structure and to decouple the electromagnetic wave reflected on the reflection body from the conducting structure. The distance measuring apparatus also includes an analysis device for calculating a distance between the injection point and the reflection body from the phase difference
(Continued)

Figure 2:
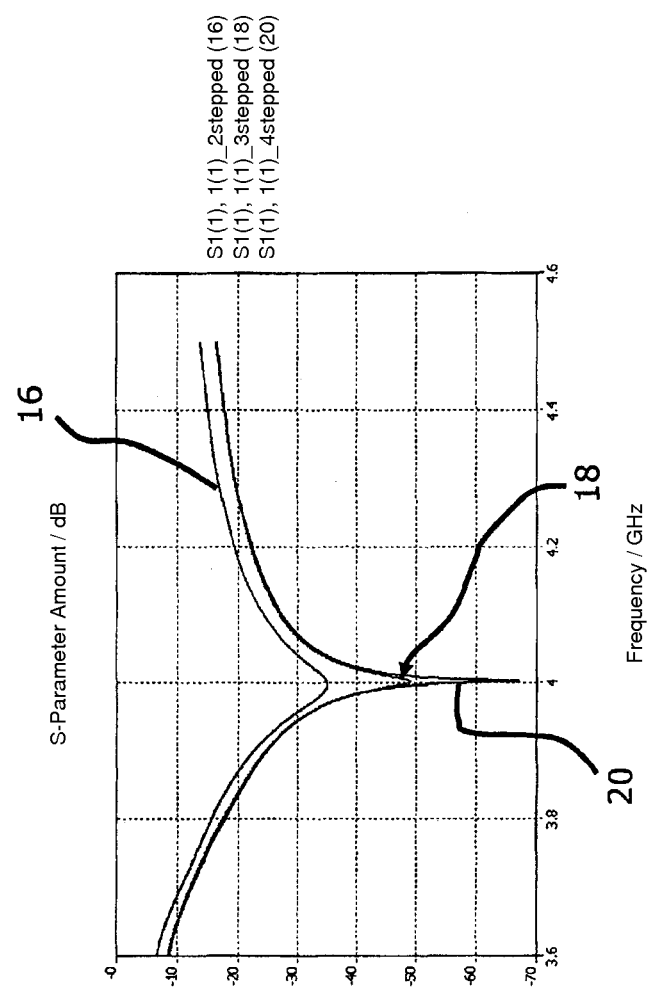

between the injected electromagnetic wave and the decoupled electromagnetic wave.

17 Claims, 26 Drawing Sheets

(51) Int. Cl.
    *F15B 15/28* (2006.01)
    *G01D 5/48* (2006.01)
    *G01S 7/02* (2006.01)
    *G01S 13/88* (2006.01)
(58) Field of Classification Search
    USPC .................................................. 324/637–648
    See application file for complete search history.

(56) References Cited

U.S. PATENT DOCUMENTS

| | | | |
|---|---|---|---|
| 4,359,683 A | 11/1982 | Chivers | |
| 4,375,057 A | 2/1983 | Weise et al. | |
| 4,542,652 A | 9/1985 | Reuter et al. | |
| 4,728,960 A * | 3/1988 | Lo | G01S 7/038 343/700 MS |
| 4,757,745 A * | 7/1988 | Taplin | F15B 15/2869 324/644 |
| 4,903,033 A * | 2/1990 | Tsao | H01Q 9/0414 343/700 MS |
| 5,036,332 A * | 7/1991 | Thomas | H01Q 25/04 333/21 A |
| 6,445,193 B1 | 9/2002 | Trummer et al. | |
| 7,663,287 B2 | 2/2010 | Haga et al. | |
| 9,267,823 B2 | 2/2016 | Trummer et al. | |
| 2004/0246174 A1* | 12/2004 | Lamour | H04B 7/10 342/361 |
| 2005/0191027 A1 | 9/2005 | Trummer | |
| 2006/0238350 A1* | 10/2006 | Tessier | G01S 5/14 340/572.7 |
| 2007/0003210 A1 | 1/2007 | Trummer | |
| 2007/0170930 A1 | 7/2007 | Bassali et al. | |
| 2008/0106272 A1 | 5/2008 | Maier et al. | |

FOREIGN PATENT DOCUMENTS

| | | |
|---|---|---|
| DE | 10 2006 021205 A1 | 11/2007 |
| DE | 10 2006 038469 A1 | 2/2008 |
| DE | 10 2006 052790 A1 | 5/2008 |
| DE | 10 2007 003389 A1 | 7/2008 |
| DE | 10 2007 020046 A1 | 10/2008 |
| EP | 1 005 100 | 5/2000 |
| GB | 992067 | 5/1965 |

\* cited by examiner

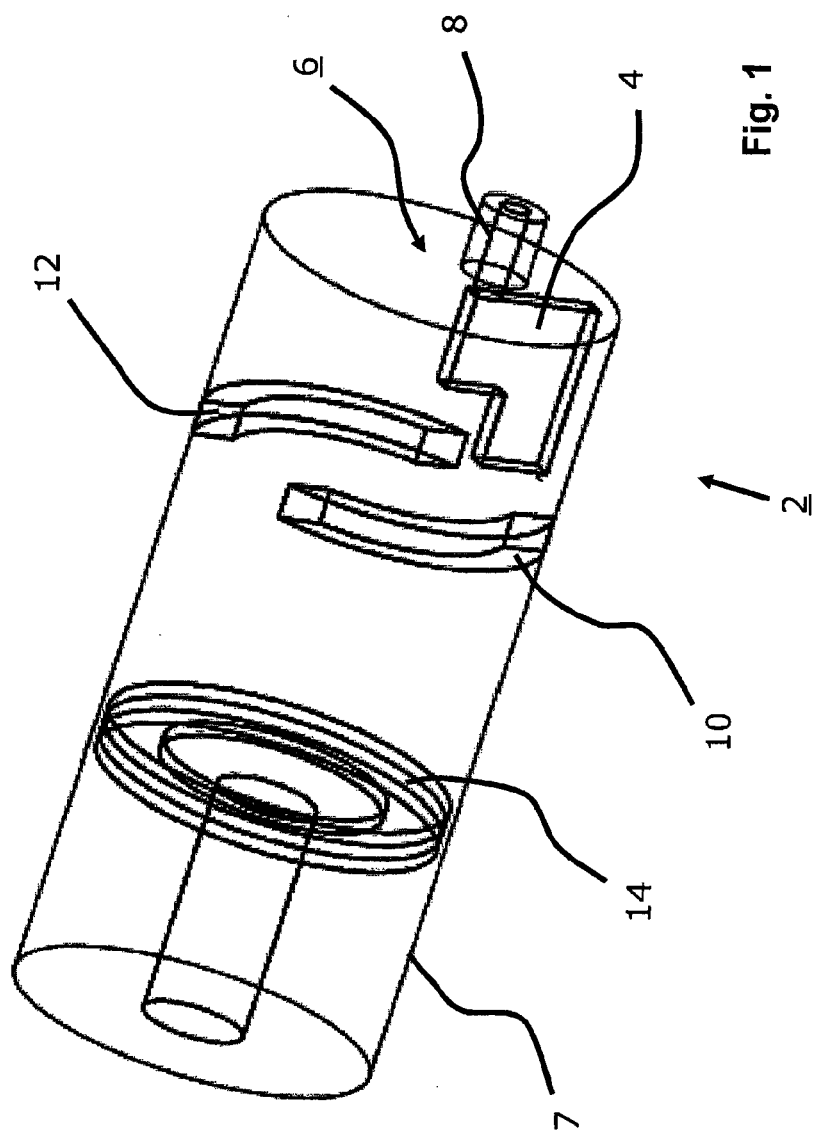

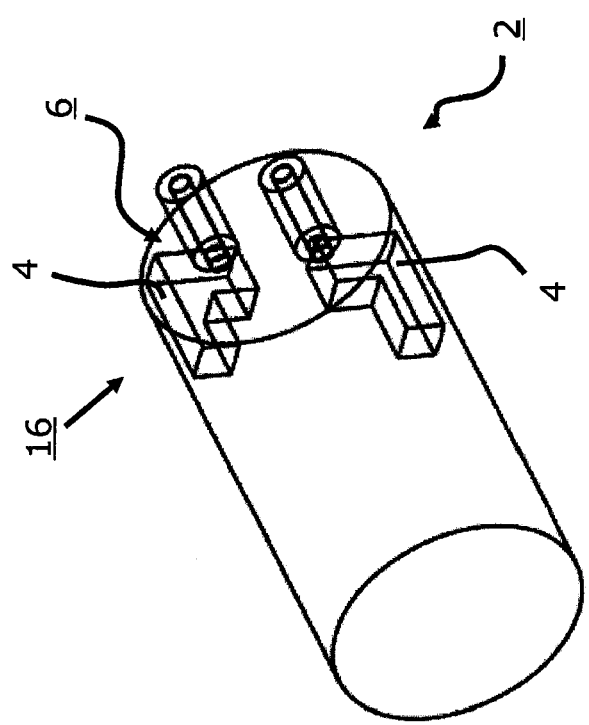

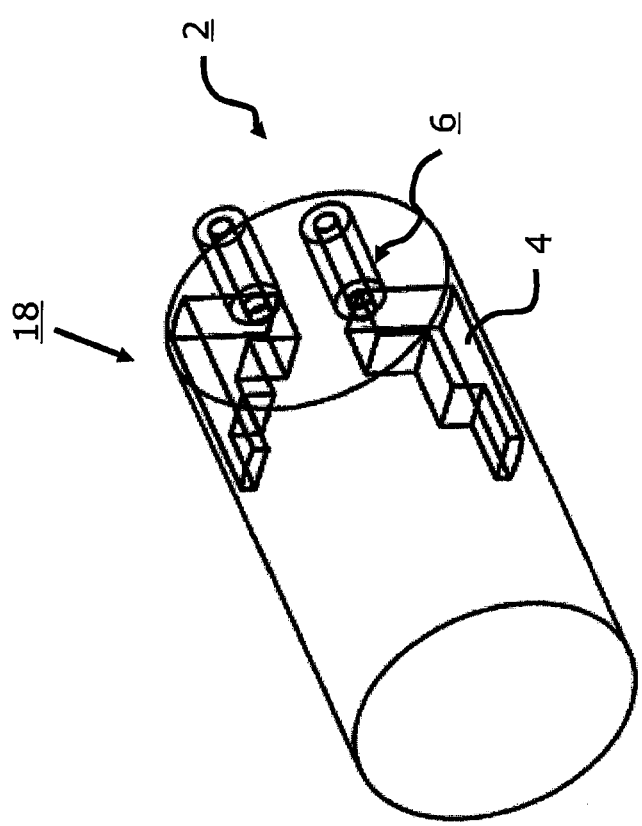

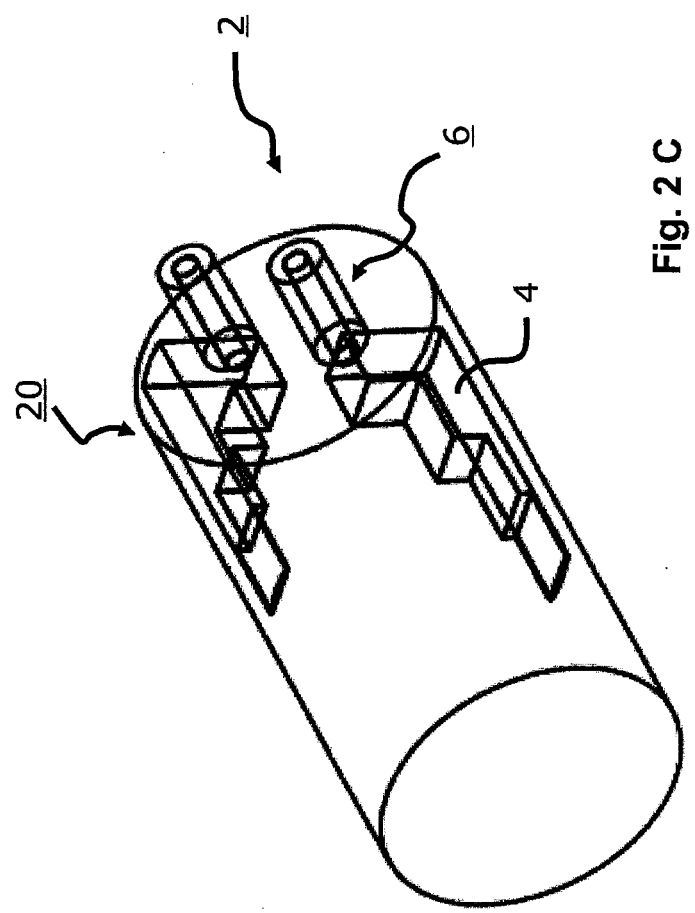

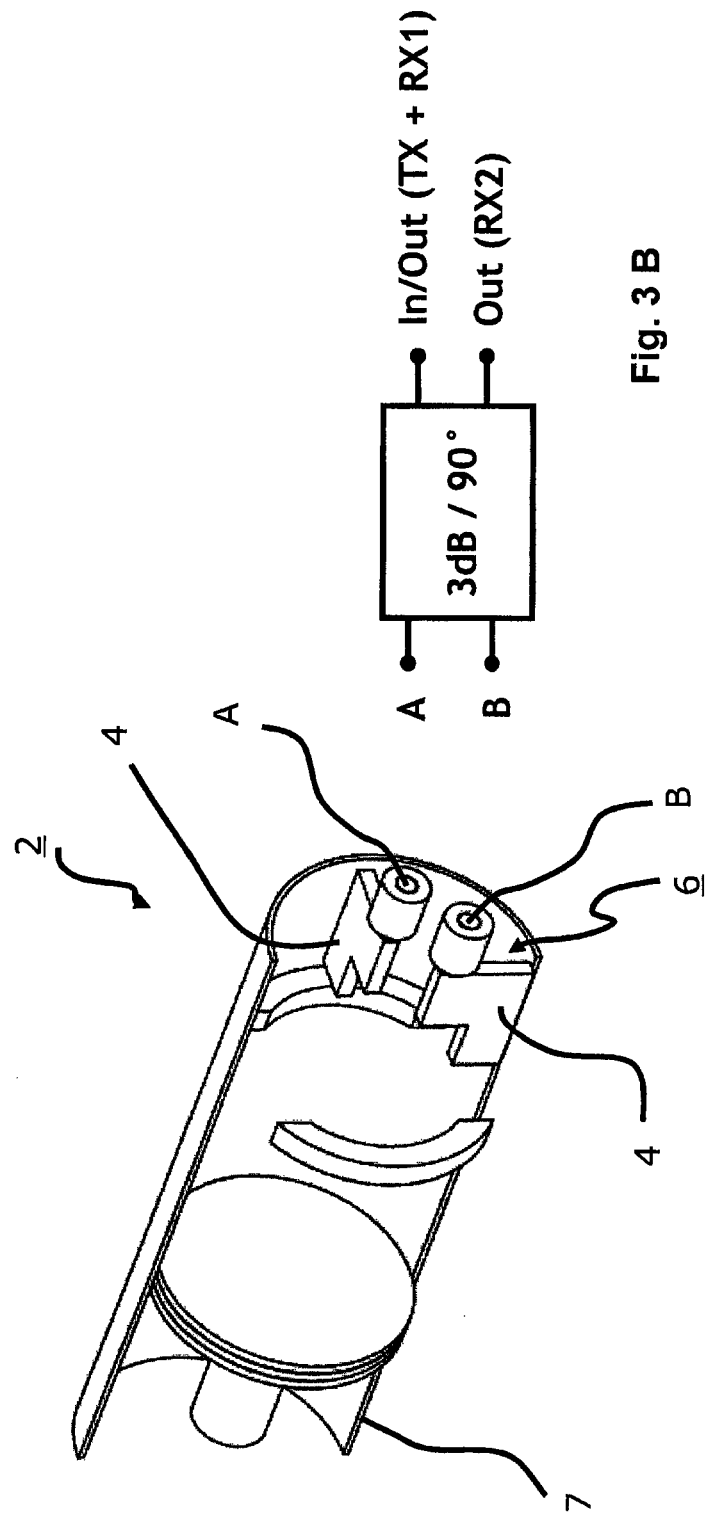

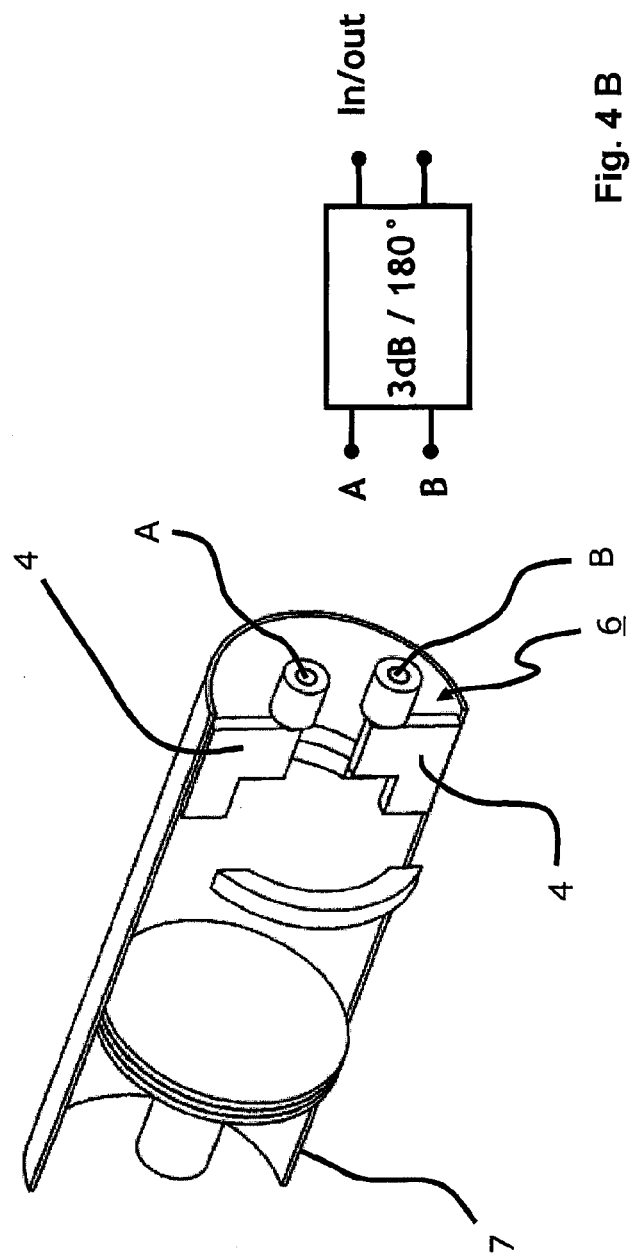

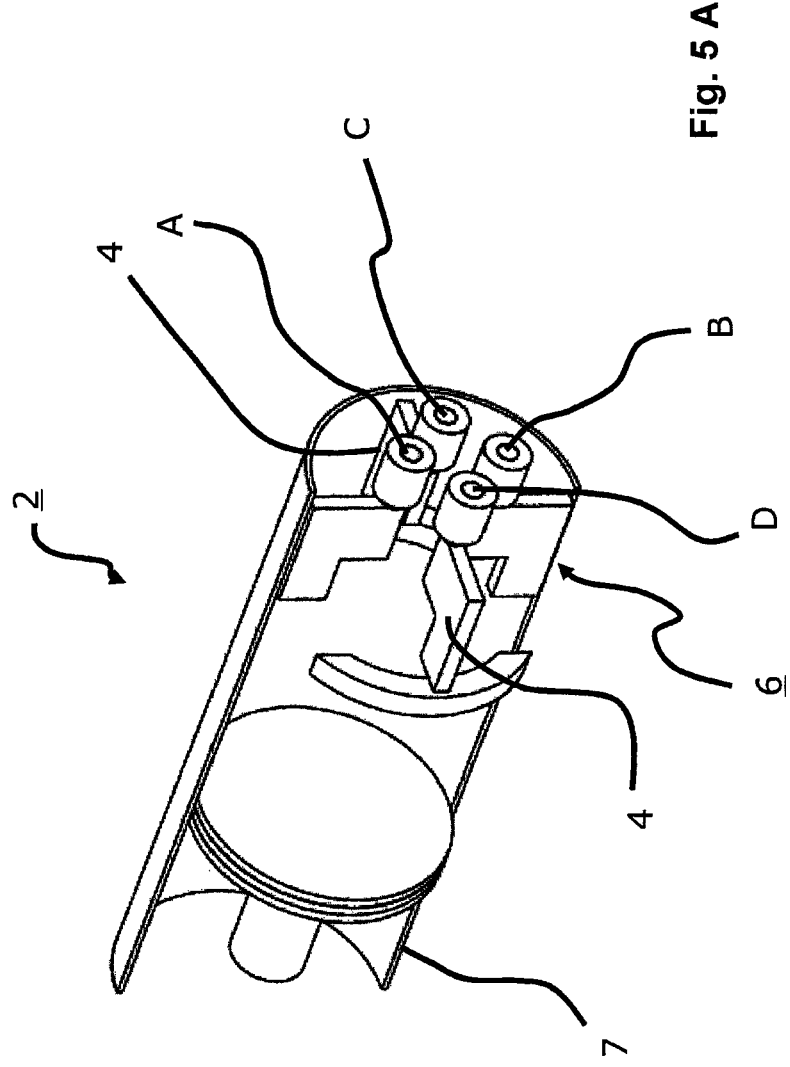

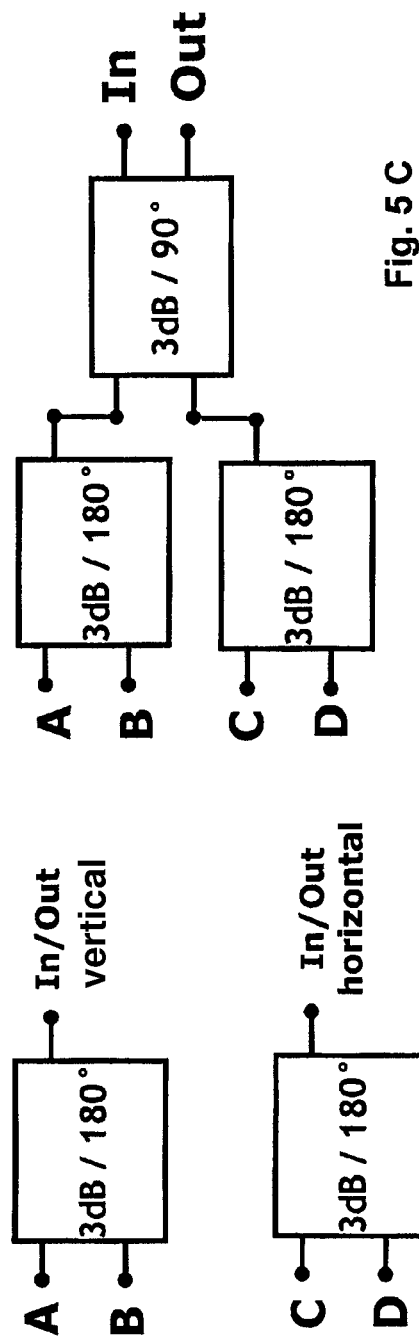

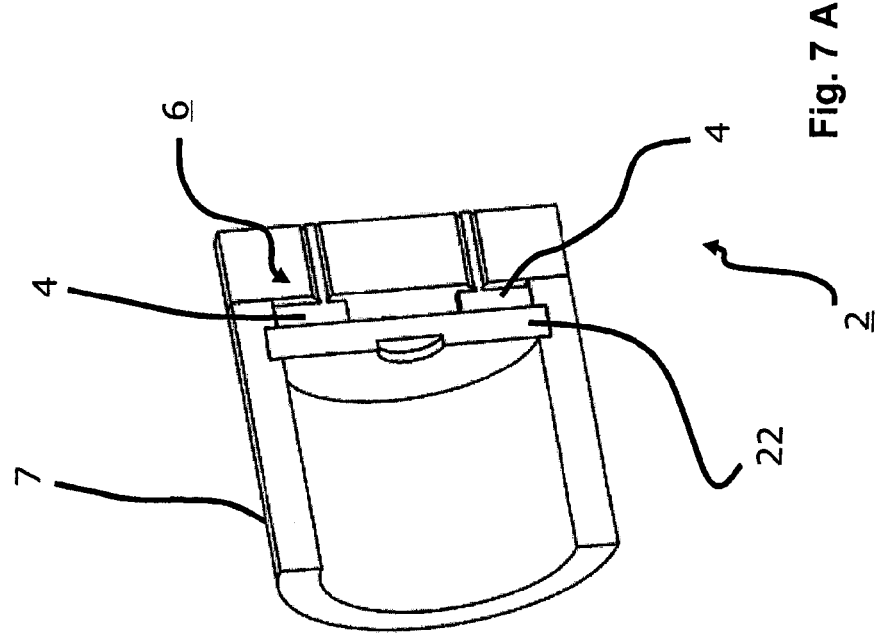

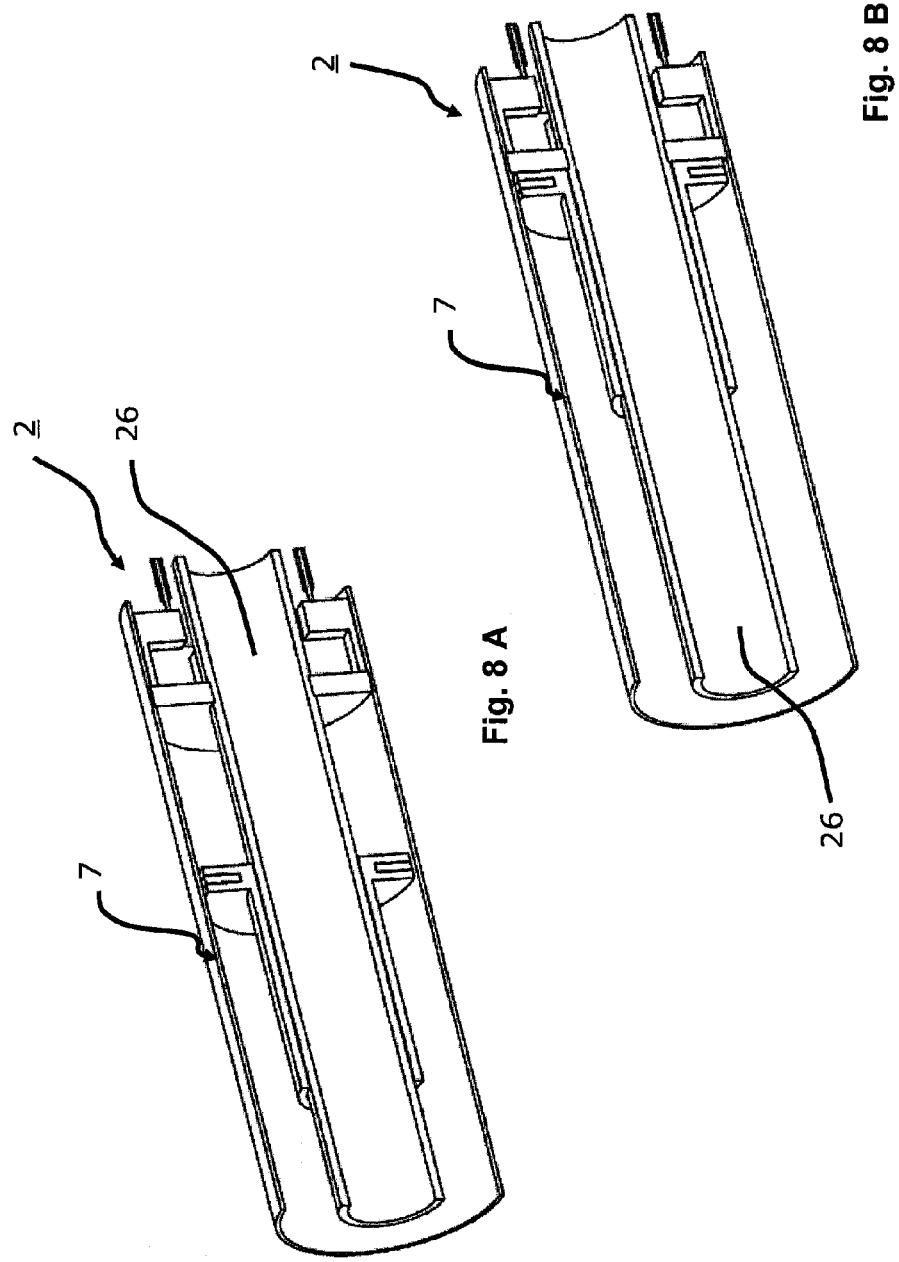

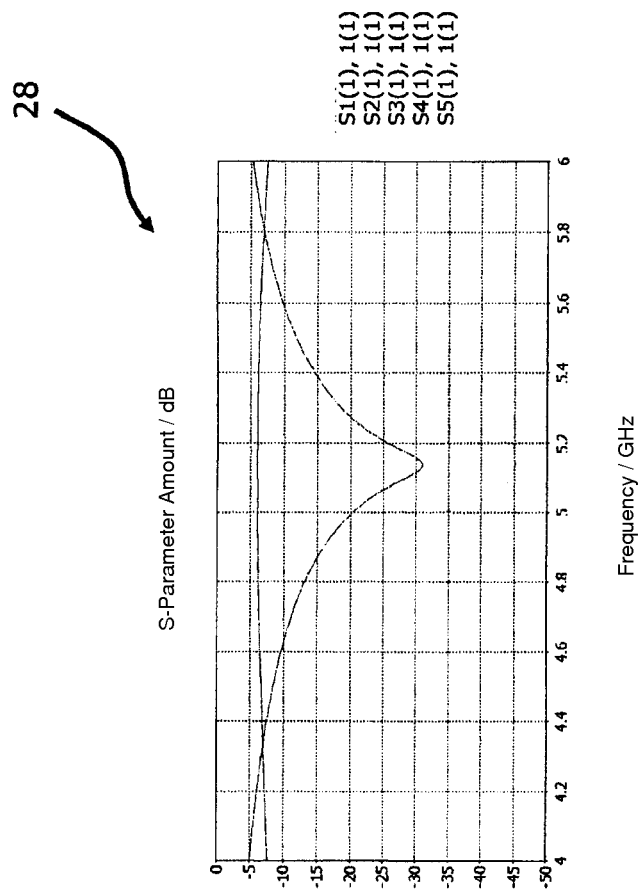

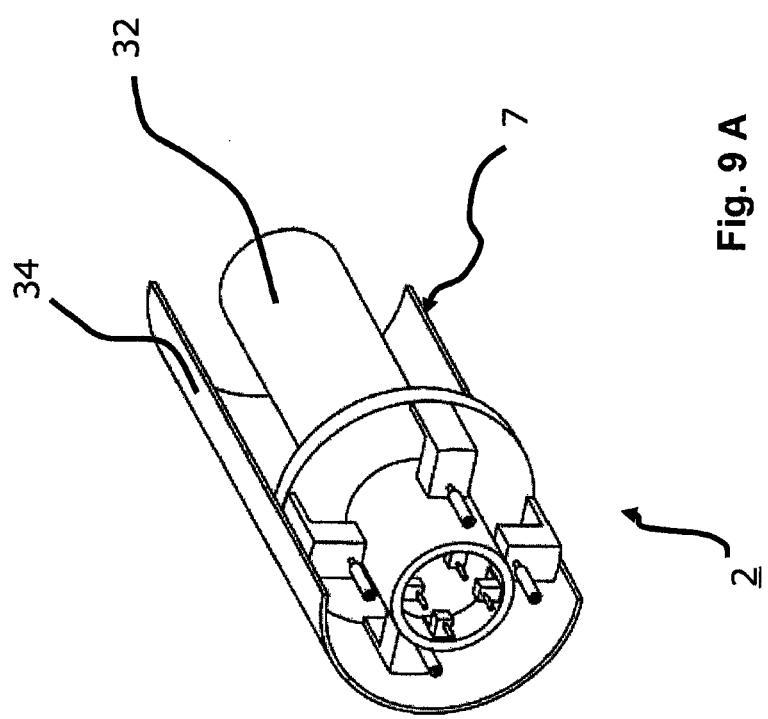

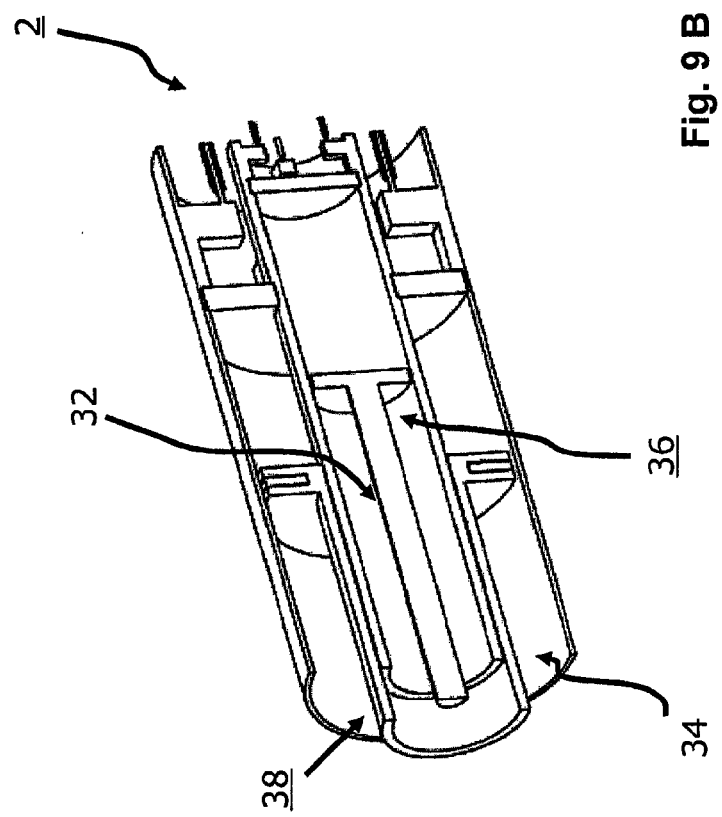

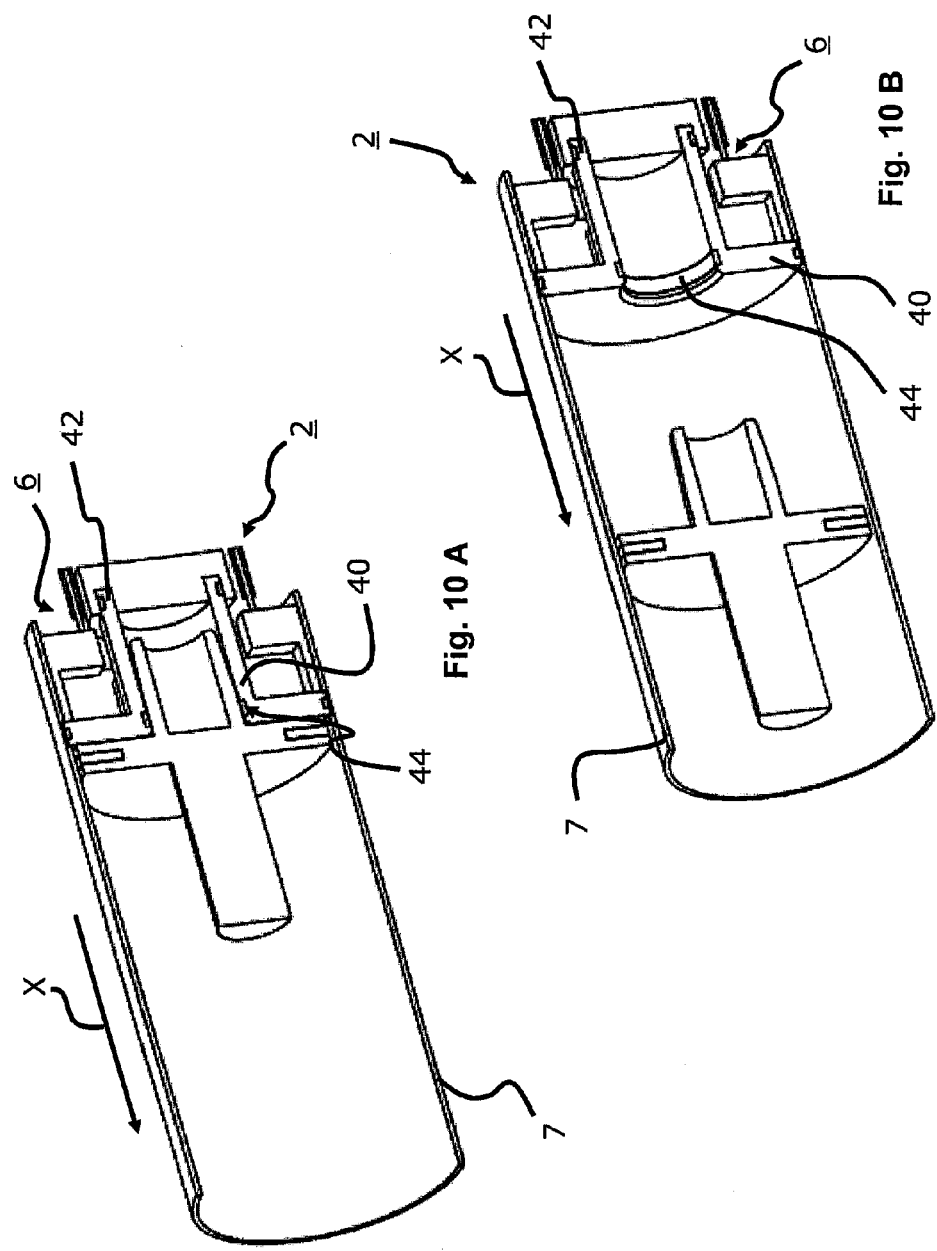

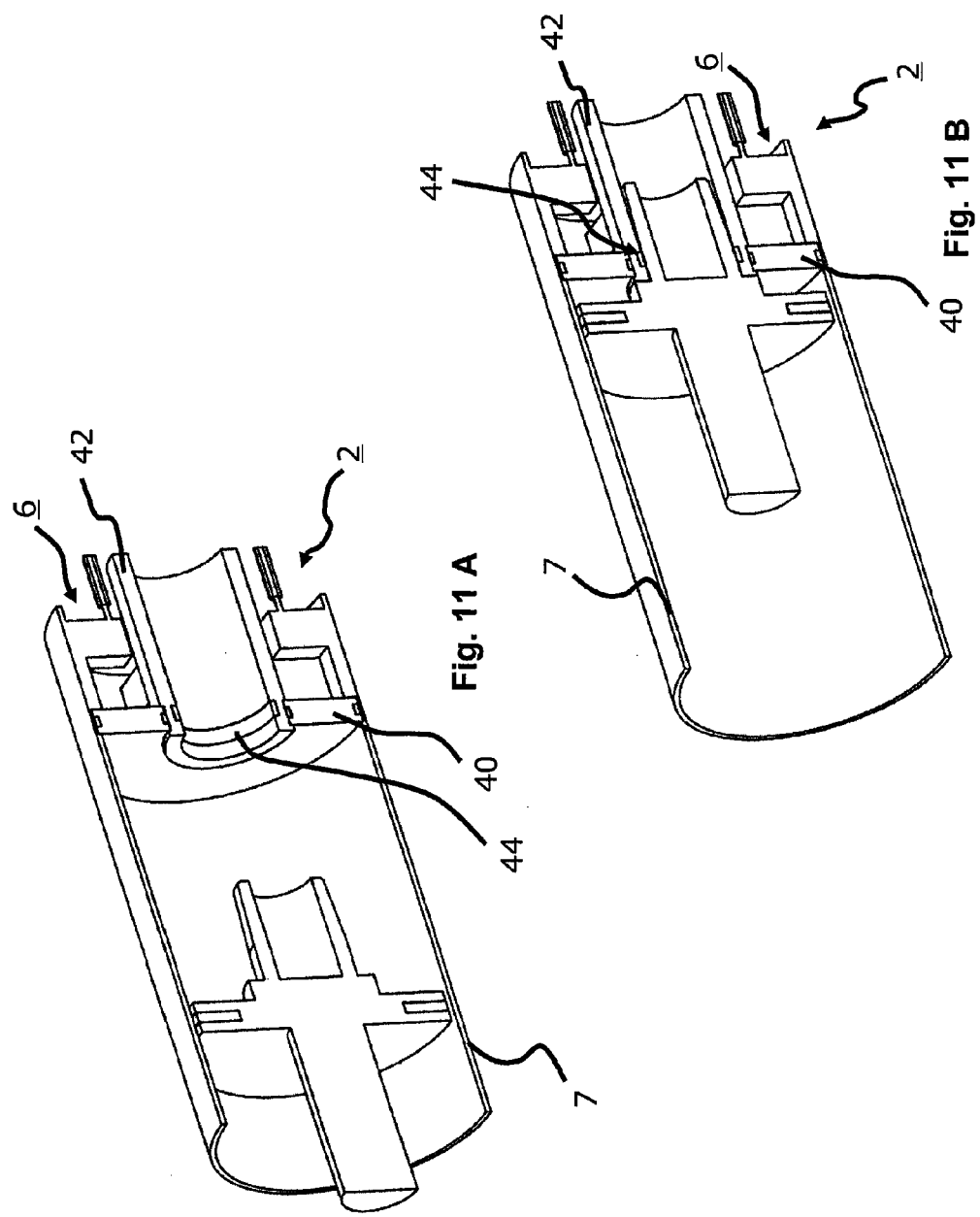

DISTANCE MEASURING APPARATUS AND METHOD FOR CALCULATING A DISTANCE IN A CONDUCTING STRUCTURE

The present invention relates to a distance measuring apparatus and to a method for calculating a distance.

Among other things, conventional distance measuring apparatuses are used, for example, for detecting the piston position of linear drives with pneumatic or hydraulic cylinders. The detection of the piston position on cylinders can be both discrete, i.e. at discrete points, and continuous, i.e. constant during operation.

Discrete determination of the piston position is generally required in order to report the execution or completion of a piston movement to a process control (e.g. SPS) so as to thus, for example, be able to initiate the next procedural step.

For this purpose sensors or sensor devices sensitive to magnetic fields are predominantly used which detect the magnetic field of a permanent magnet located on the cylinder piston. These types of sensor are predominantly in the form of sensors sensitive to magnetic fields and are known as Reed switches, magnetoresistive (MR), giant magnetoresistive (GMR) switches, Hall switches or magnet inductive proximity switches. The sensors used here are fitted externally on the cylinder tube of the piston cylinder. If the piston moves into the detection range of one of these sensors, the latter recognises the presence of the cylinder piston through the cylinder tube.

If on the other hand a different position is detected, the sensor must be correspondingly mechanically adjusted. For every position additionally to be detected a further sensor must consequently be fitted with the associated additional material, fitting, adjustment and installation costs. This generally takes place at the customer's premises. Often the cylinder is already fitted here in a machine with poor access, and adjustment of the switch distances by mechanically shifting the externally fitted magnetic switches is no longer possible.

Furthermore, additional installation space is required for these externally fitted sensors. In order to be able to guarantee the accessibility and robustness of the sensor, increased structural complexity is often necessary. The external fitting of the sensors is not satisfactory because the latter could be disrupted by foreign influences from the outside. The attachment of the sensors fitted on the cylinder could break, and the sensors could fall to the floor. This would result in an error being signalled and the assembly line coming to a standstill. 50% of all breakdowns with pneumatic drives happen in the aforementioned way.

For continuous piston position measurement measuring systems are normally used which function potentiometrically, magnetostrictively or according to the LVDT (Linear Variable Differential Transformer) principle. With these systems the piston position is continuously issued, predominantly as an analogue voltage signal. Sensors according to the LVDT principle always require a reference path when switched on. Incremental path measurements are also known as a supplement to these systems. These systems are realised, for example, by the magnetic coding of the piston rod, and so can only be used for the relative measurement of a path. In addition, when the piston rod extends any cuttings are drawn to it, and these then destroy the seal when the piston rod is retracted. Magnetostrictive and potentiometric path measuring systems are fitted externally or within the piston rod which is to be drilled hollow. The hollow piston rod weakens the drive and the external fitting causes considerable logistical complexity.

Neither the continuous nor the discrete piston position determination can be integrated into a cylinder, or only with considerable structural complexity and the associated high costs. The considerable structural complexity arises from the fact that all of the well-established sensor principles described must be adapted to the corresponding cylinder length since they have a detection range which is too short.

Patent specification PCT/EP03/00894 describes the integration of a microwave sensor into the pneumatically/hydraulically operated cylinder chamber. Advantages of this solution are that the sensor is positioned centrally, and this space is frequently required for pneumatic end cushioning. Further advantages are that the piston must be designed such that it displays the most ideal possible high frequency target the measuring accuracy of the sensor is substantially dependent upon the adaptation of the coupling probe the measuring principle only functions in the half of the cylinder without the piston rod dielectric holding systems are required for fastening the antenna With the sensor design described below far-reaching integration of a path sensor into a linear drive is possible without the disadvantages described above associated with direct integration having to be taken into account.

It is therefore the object of the present invention to provide a distance measuring apparatus and a method for calculating the distance which overcome the disadvantages described above and which enable continuous, and therefore discretisable distance calculation, simple handling and a wide range of possible uses.

This object is achieved by the apparatus having the features of Claim 1 and by the method having the features of Claim 27.

The distance measuring apparatus according to the invention for determining the piston position in cylinders has the following properties:

continuous, absolute distance measurement with particularly high precision;

total integration of the transmitting and receiving device and of the analysis electronics in the cylinder cover, i.e. there are no parts to be fitted externally. Furthermore, no mechanical alteration to the pneumatically relevant parts of the cylinder, for example the piston, the end cushioning, the piston rod or the air supply is necessary;

the distance measuring apparatus can be used keeping the existing standard dimensions;

it should be possible to adjust switch distances externally by means of an electronic interface (teach-in capability);

a universally useable sensor (transmitting and receiving device), independently of the cylinder length (X length capability)

measurement results can be provided independently of pressure, oil and humidity within the cylinder;

a sensor (transmitting and receiving device) for all well-established cylinder diameters.

According to the invention a distance measuring apparatus and a method for calculating a distance is made available, the sensor device having a high-frequency transmitting and receiving device, a cross-over from the coaxial conductor into a hollow conductor which can be in the form of a cylinder, a reflection target and an analysis unit. The transmitting/receiving device serves to measure a specific distance in a hollow conducting structure by radiating and receiving waves.

Moreover, according to the invention a distance measuring apparatus for calculating a distance between a reflection body in a conducting structure and an injection point for electromagnetic waves provided at an end section of the conducting structure, with a transmitting and receiving device with a conduction cross-over provided at the injection point for coaxially inductive coupling of the transmitting and receiving device to the conducting structure in order to inject an electromagnetic wave into the conducting structure and to decouple the electromagnetic wave reflected on the reflection body from the conducting structure, and with an analysis device for calculating the distance between the injection point and the reflection body from the phase difference between the injected electromagnetic wave and the decoupled electromagnetic wave.

According to the invention a method is provided with which the length of the conducting structure up to the reflection target is measured. The transmission signal provided by the method according to the application is fed into a conducting structure, reflected on the reflection target and received again via the feed system. In this way the measurement of the distance between the injection point defined by the inductive hollow conductor cross-over and the reflection target is implemented. The distance is measured here by measuring the phase difference between the transmission and receipt signal with different frequencies and polarisations of the electromagnetic wave.

According to the invention a method for calculating a distance between a reflection body in a conducting structure and an injection point for electromagnetic waves provided at an end section of the conducting structure is made available, the method comprising the following procedural steps:

injecting an electromagnetic wave into the conducting structure via a coaxially inductive conduction cross-over at the injection point, decoupling the electromagnetic wave reflected on the reflection body from the conducting structure via the conduction cross-over, and calculating the distance between the injection point and the reflection body from the phase difference between the injected and the decoupled electromagnetic wave.

The invention has the following advantages in particular:

all of the components of the sensor system are configured to be small such that almost no or only very slight reconstruction measures are required for integration into the cylinder;

the sensor device can be totally accommodated within the end cover of a pneumatic cylinder;

therefore, the whole structure of the distance measuring apparatus according to the application has a clean, smooth design due to dispensing with the possibility of fitting external sensor devices, and so this has no effect upon the external appearance.

The dependent claims constitute advantageous further developments of the apparatus according to the invention and of the method according to the invention.

Advantageously the conducting structure is in the form of a hollow cylinder. In an advantageous further development the hollow cylinder is in the form of a pneumatic or hydraulic cylinder, Advantageously a piston is provided in the hollow cylinder which acts as a reflection body.

According to an advantageous further development injection of the electromagnetic wave into the conducting structure takes place in the frequency range between 1 MHz and 100 GHz in the form of a monomodal electromagnetic wave. Advantageously the injection of the electromagnetic wave into the conducting structure takes place in the H11 or E01 mode, or with a coaxial conductor structure, in particular with piston rods formed continuously within the cylinder, in the TEM mode.

In order to generate a linearly polarised, electromagnetic wave in the E01 mode a coaxial wave is advantageously injected in phase into the conducting structure via an electrically conductive, inductive mode transformer of the conduction cross-over or via two or four electrically conductive, inductive mode transformers of the conduction cross-over.

In order to inject a horizontally or vertically linearly polarised, electromagnetic wave into the conducting structure, the conduction cross-over has in an advantageous further development an electrically conductive, inductive mode transformer.

Advantageously the conduction cross-over has two electrically conductive, inductive mode transformers which are positioned offset by 180 degrees in relation to one another over a circular path of a circle provided in the region of the end section and by means of which linearly polarised, electromagnetic waves, which are phase-shifted by 180 degrees in relation to one another, can be injected into the conducting structure.

In an advantageous further development the conduction cross-over has two electrically conductive, inductive mode transformers which are arranged offset by 90 degrees in relation to one another on a circular path of a circle provided in the region of the end section, and by means of which vertically or horizontally polarised, electromagnetic waves can be injected in parallel into the conducting structure.

According to an advantageous further development the conduction cross-over has four electrically conductive, inductive mode transformers which are arranged offset by 90 degrees in relation to one another on a circular path of a circle provided in the region of the end section, and vertically polarised, electromagnetic waves, which are phase-shifted by 180 degrees in relation to one another, can be injected in parallel into the conducting structure via two mode transformers offset by 180 degrees in relation to one another, and horizontally polarised electromagnetic waves, which are phase-shifted by 180 degrees in relation to one another, via two mode transformers offset by 180 degrees in relation to one another and which are offset by 90 degrees respectively to the mode transformers for the vertically polarised, electromagnetic waves.

Advantageously the conduction cross-over has two electrically conductive, inductive mode transformers which are arranged offset by 90 degrees in relation to one another on a circular path of a circle provided in the region of the end section, and by means of which circularly polarised, electromagnetic waves, which are phase-shifted by 90 or 180 degrees in relation to one another, can be injected into the conducting structure. A circularly polarised wave can also be generated with four mode transformers offset by 90 degrees. However, the signals fed onto the mode transformers, e.g. in the clockwise direction, are then respectively phase-shifted by 90 degrees in relation to one another.

In an advantageous further development the respective mode transformer is in the form of a mechanical stairway. According to an advantageous further development the mechanical stairway is arranged with a decreasing step height in the direction of the reflection body on the conducting structure. Advantageously the respective stairway is implemented with two, three, four or more steps.

In order to couple the transmitting and receiving device to the conducting structure, the conduction cross-over advantageously has the contacting between the respective mode transformer and a coaxial inner conductor which on the end of the conducting structure is inserted into the rear surface of the highest step of the mechanical stairway of the mode transformer. Advantageously a distance of a few millimeters is provided between the rear surface of the highest step of the mechanical stairway and a cover rear wall of the conducting structure formed as an end section.

With circular polarisation, in order to convert the anticlockwise or clockwise electromagnetic wave into a horizontally or vertically polarised electromagnetic wave, the transmitting and receiving device advantageously has for the respective mode transformer a branch line coupler and a coupler downstream of the latter with 3 dB coupling and with a phase rotation of 180 degrees. In this way the target echo of a circularly polarised, electromagnetic wave which was reflected on the reflection body in total reflection and an associated change to the circular direction of rotation, i.e. from anticlockwise to clockwise or from clockwise to clockwise, is separable from interference echoes which are not subject to total reflection.

In order to detect vertically and horizontally polarised, electromagnetic waves at the same time, according to an advantageous further development the transmitting and receiving device has a 2-channel receiver.

Advantageously the inductive mode transformers for multiple piston systems with at least one outer piston and at least one internal piston are designed, in order to detect the distance between the outer piston or the inner piston and the injection point, to decouple both the wave reflected by the outer piston and the electromagnetic wave reflected by the internal piston.

In order to shorten the swing-in path of an injected electromagnetic wave in one mode, there is advantageously provided between the reflection body and the mode transformers a dielectric disc adjacent to the latter, preferably made of lexan, PPS 40 or teflon, over the whole internal diameter of the conducting structure.

According to an advantageous further development the dielectric disc is provided in the centre with an inner tube so that a damping piston can plunge into the inner tube. Advantageously the inner tube is made of metal.

In order to restrict the run of the piston in the direction of the conduction cross-over there is provided in the conducting structure a piston stop which co-operates with the conducting structure as two quadrant rings. In an advantageous further development the dielectric disc serves as a piston stop.

According to an advantageous further development the distance measuring device is in the form of a termination, end cover or end section of the conducting structure so that a conducting structure in the form of a hollow cylinder can be provided particularly simply with the distance measuring apparatus and with a particularly great saving of cost and time. In order to alter a hollow cylinder only the rear wall lying opposite the piston acting as a cable termination or end section need be replaced, with very little effort, by the distance measuring apparatus. Otherwise no alterations and/or adaptations need to be made to the conducting structure or to the hollow cylinder.

For alterations and for maintenance and repairs to the conducting structure and/or the distance measuring apparatus and for exchanging the distance measuring apparatus on the conducting structure it is advantageous to provide attachment of the distance measuring apparatus to the conducting structure such that the distance measuring apparatus can be detached from the conducting structure. In this way the distance measuring apparatus can be fully produced and tested before the final fitting on the hollow cylinder and/or before delivery.

In order to hold the distance measuring apparatus in the conducting structure it is advantageous to provide a ledge on the conducting structure on the side facing towards the reflection body which co-operates with the distance measuring apparatus introduced into the conducting structure as a stop so that the distance measuring apparatus can only be introduced into the conducting structure as far as the ledge.

In order to ensure that the distance measuring apparatus remains reliably in the conducting structure as a conductor termination, and in order to secure the distance measuring apparatus against slipping in the conducting structure, it is advantageous to provide a clamping ring on the side facing away from the reflection body in the conducting structure.

According to an advantageous further development the clamping ring co-operates with the conducting structure by means of a notch provided in the conducting structure into which the clamping ring is partially inserted. Moreover, the clamping ring is advantageously dimensioned such that slipping of the distance measuring device in the conducting structure on the side facing away from the reflection body is avoided.

In an advantageous further development the distance measuring apparatus in the conducting structure is held by at least one locking pin and/or at least one screw. In an advantageous further development the locking pin and/or the screw co-operates with the conducting structure by means of a bore hole in the conducting structure and with the distance measuring apparatus by means of a bore hole in the distance measuring apparatus.

In order to provide particularly reliable holding of the distance measuring apparatus in the conducting structure, a number of locking pins and/or a number of screws are advantageously provided which are respectively sunk into bore holes of the conducting structure and or the distance measuring apparatus or are screwed to the conducting structure and/or the distance measuring apparatus.

With a conducting structure in the form of a hollow cylinder the number of locking pins and/or the number of screws are advantageously provided substantially evenly distributed over a circular path following the jacket of the hollow cylinder.

In order to seal the cavity in the conducting structure between the reflection body on the piston and the distance measuring apparatus at least one seal, and advantageously two seals, is/are provided between the distance measuring apparatus and the conducting structure, one of the seals acting as a pressure seal, and the other seal as a high frequency seal. In an advantageous further development the seals are in the form of sealing rings.

According to an advantageous further development transmission signals with different transmission frequencies are injected with the electromagnetic wave. In order, for example, to cover a large measuring range, the transmission frequencies are advantageously chosen such that the difference between the transmission frequencies is small, e.g. 1% difference from the absolute value. In order to achieve, for example, a high level of interference resistance the transmission frequencies are chosen according to an advantageous configuration such that the difference between the transmission frequencies is large, e.g. 20% difference from the absolute value.

Advantageously the transmission signals emitted by the electromagnetic wave are issued continuously. According to one advantageous embodiment transmission signals formed with the electromagnetic wave as CW signals are injected.

In an advantageous further development electromagnetic waves formed with vertical and horizontal polarisation are analysed in parallel.

The transmitter consists of a VCO which feeds the electromagnetic wave inductively into the hollow conductor via a coaxial cable. Part of the transmission power is resistively decoupled and made available to the receipt mixer's as a local oscillator. Likewise the received signal is decoupled from the transmission channel by means of couplers because the feed arrangement is used both for the transmitter and the receiver. The coaxial wave is thus converted into the H11 wave type of the hollow conductor by a mode transformer by inductively coupling the hollow conductor. The contacting takes place by the coax inner conductor being attached to the face side of the mode converter e.g. by pushing into a bore hole. There is a space in the millimeter range between the metallic cover end wall and the mode converter. By means of the number of mode converters one can determine a different polarisation of the wave and the stimulation of waves with higher modes as follows:

H11—linear polarisation with one mode converter:

By means of this asymmetrical, inductive coax hollow conductor feed not only waves of wave type 11 are stimulated however, but also all H modes following the periodicity.

Upon the basis of the pre-specified basic condition for the external diameter of the hollow conductor (aperiodic damping of hollow conductor modes dependently upon the specific limit frequency) only after a corresponding distance covered (swing-in characteristics), however, can the H11 mode propagate and convey energy.

H11—linear polarisation with two mode converters:

By adding a further inductive coax hollow conductor feed mirrored by 180 degrees a symmetrical stimulation is forced and the number of stimulated modes and so also the required distance covered is shortened.

The injection of the two signals phase-shifted by 180° in the coaxial conducting system is, however, a basic pre-requisite of this stimulation.

By using the orthogonality of the H11 hollow conductor wave:

H11x-H11y:

By using the orthogonality of the H11 hollow conductor wave, i.e. the theoretically totally decoupled propagation of two identical hollow conductor waves of the type H11x and H11y a redundant $2^{nd}$ signal can be used within the system. In this way operational reliability and also the measuring accuracy can be increased.

As with the simple use of the H11 wave type, with the dual use the simple or dual mode converter can also be used, i.e. with H11x-H11y—linear polarisation (vertical and horizontal) with a respective mode converter and with H11x-H117—linear polarisation (vertical and horizontal) with two respective mode converters.

Circular polarisation:

Due to the orthogonality of the H11x and H117 wave type the use of circular polarisation is however also possible in addition to the use of the dual linear polarisation.

The circular polarisation is generated by stimulating the two orthogonal wave types with a signal phase-shifted by 90°.

In addition, however, the stimulation must also be generated by a second injection rotated by 90°.

By using the circular stimulation the following operational states are possible:

H11x-H11y circular polarisation with two mode converters respectively (the mode converters are arranged circularly offset by 90 degrees);

H11x-H11y circular polarisation with four mode converters respectively (the mode converters are arranged over a circular path of a circle respectively offset by 90 degrees in relation to one another).

Additional operating mode by using the E01 wave type:

As already mentioned it is basically possible to stimulate all modes by using the coax hollow conductor mode converter provided that the latter are capable of being propagated by means of a corresponding guarantee of the basic conditions.

A further wave type which can be used by changing the basic condition (diameter of the hollow conductor) and the corresponding stimulation signals within the system is the E01 wave type.

When stimulating and propagating the same statements apply as with the H11 wave type considered.

An E01 wave type can be stimulated by the following configurations:

E01 polarisation with one mode converter;
E01 polarisation with two mode converters (90° rotation, in phase stimulation)
E01 polarisation with two mode converters (180° rotation, in phase stimulation);
E01 polarisation with four mode converters (4×90° rotation, in phase stimulation).

Moreover, the general basic pre-requisite that the hollow conductor diameter is adapted to the E01 limit frequency applies.

Mode of operation with cylinders with a continuous piston rod:

With cylinders with a continuous piston rod the TEM mode is preferably stimulated. Stimulation of the H11 mode is also possible. With this configuration the inductive mode converter presented can also be used.

Band width and adaptation of the mode converter:

The band width of the mode converter is determined by the quality of the adaptation of the corresponding wave types to one another.

The adaptation is achieved by an impedance transformation.

This band width of the transformation can be controlled by the number of transformation steps used (mechanically: number of steps of the stairway-type inductive hollow conductor coupling). The number of transformation steps generates a corresponding overall length of the mode converter here. Under certain conditions, however, sufficient adaptation can also be achieved with a transformation step.

Shortening of the swing-in path by a dielectric window (disc):

Upon the basis of the pre-specified basic condition of the external diameter of the hollow conductor (aperiodic damping of hollow conductor modes dependently upon the specific limit frequency) the H11 mode can, however, only propagate and convey energy after a corresponding distance covered (swing-in characteristics). This distance covered can be shortened correspondingly if a dielectric window in the form of a disc with a dielectricity number with a value of much greater than 1 directly follows the mode transformers. PPS 40, lexan or teflon can preferably be used as the material. The dielectric disc can at the same time be designed such that it serves as a mechanical piston stop.

Pneumatic end cushioning:

The dielectric disc can be shaped such that it adopts a hat-like configuration. The bulge in the middle is suitable for allowing a damping piston fitted as an appendage to the piston rod to retract. At the same time a sealing ring that can move in the axis of movement of the piston is provided. The tube for holding the damping piston can also be made of metal. Under this condition too injection of the electromagnetic wave is possible.

Mechanical end stop:

A double-shell quadrant arrangement can also be used as a mechanical end stop for the piston.

EXEMPLARY EMBODIMENTS

Figure 6:
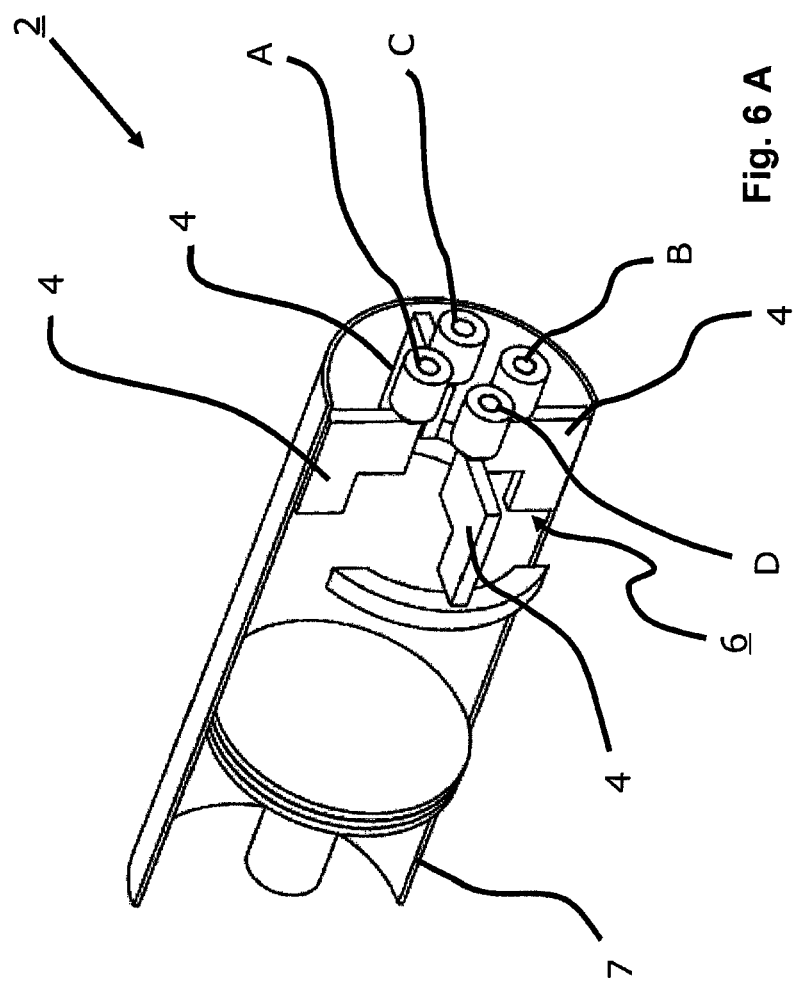
Figure 6:
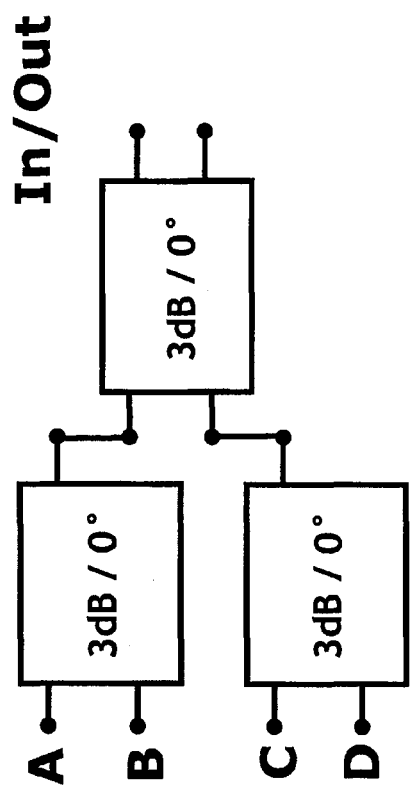
Figure 7:
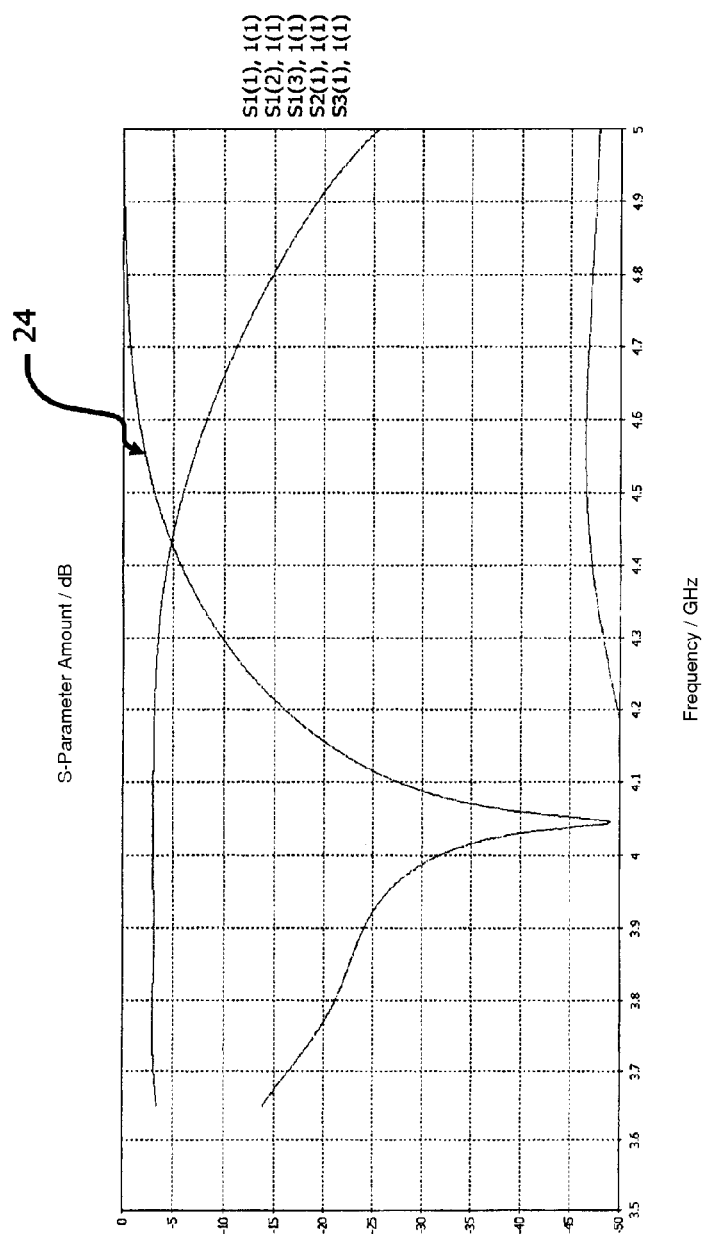
Figure 8:
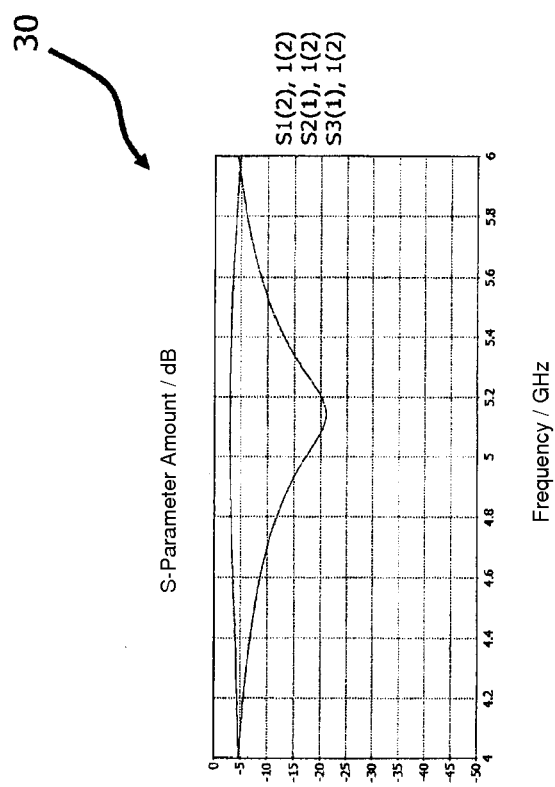
Figure 12:
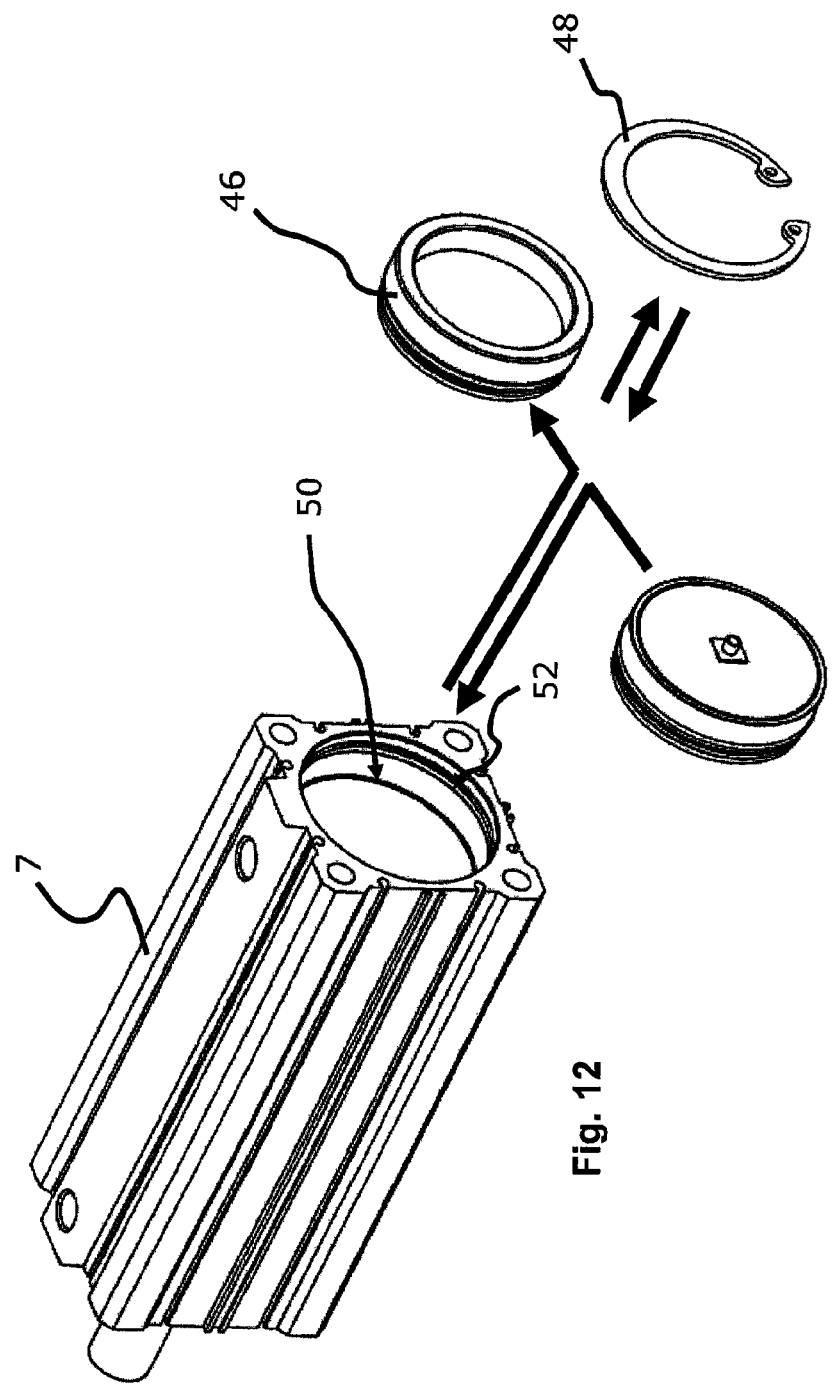
Figure 13:
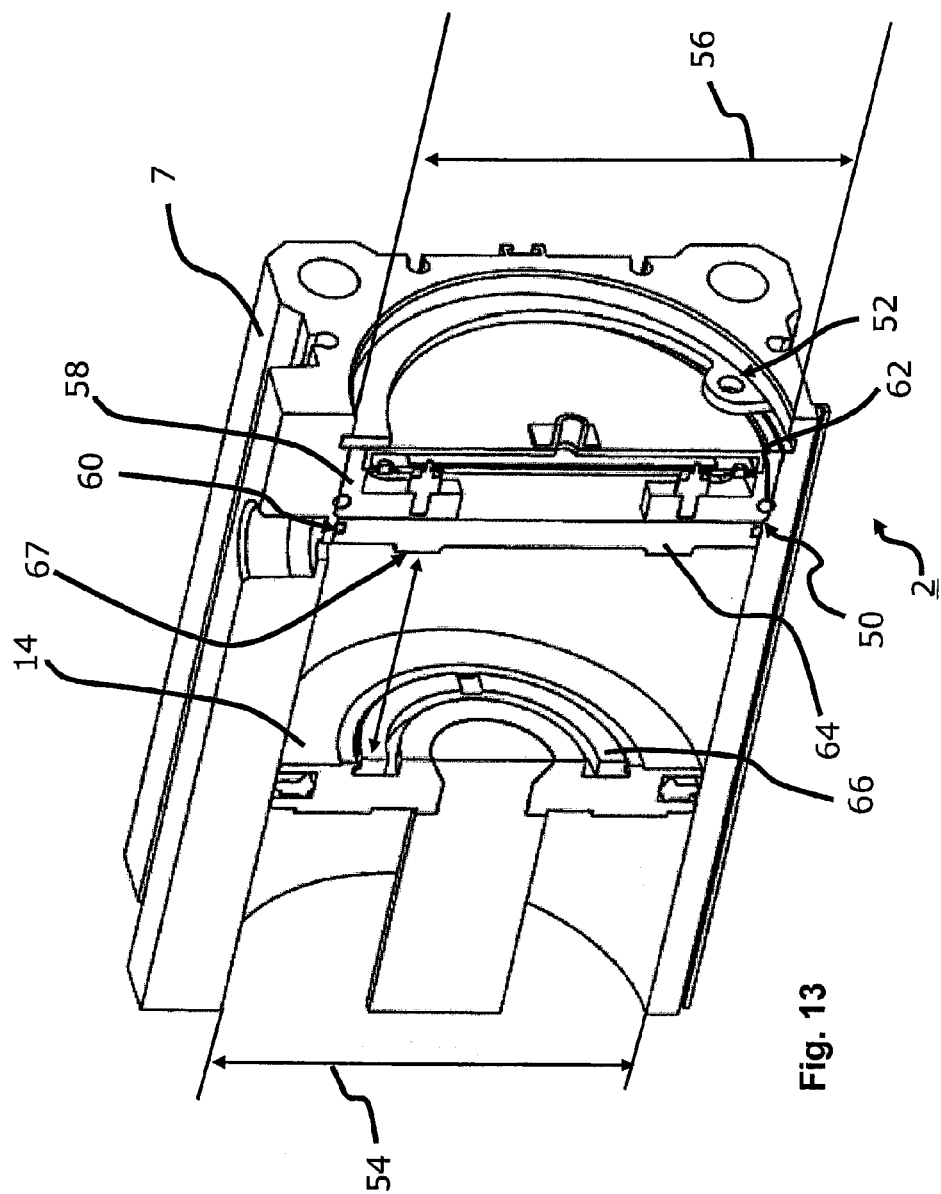
Figure 14:
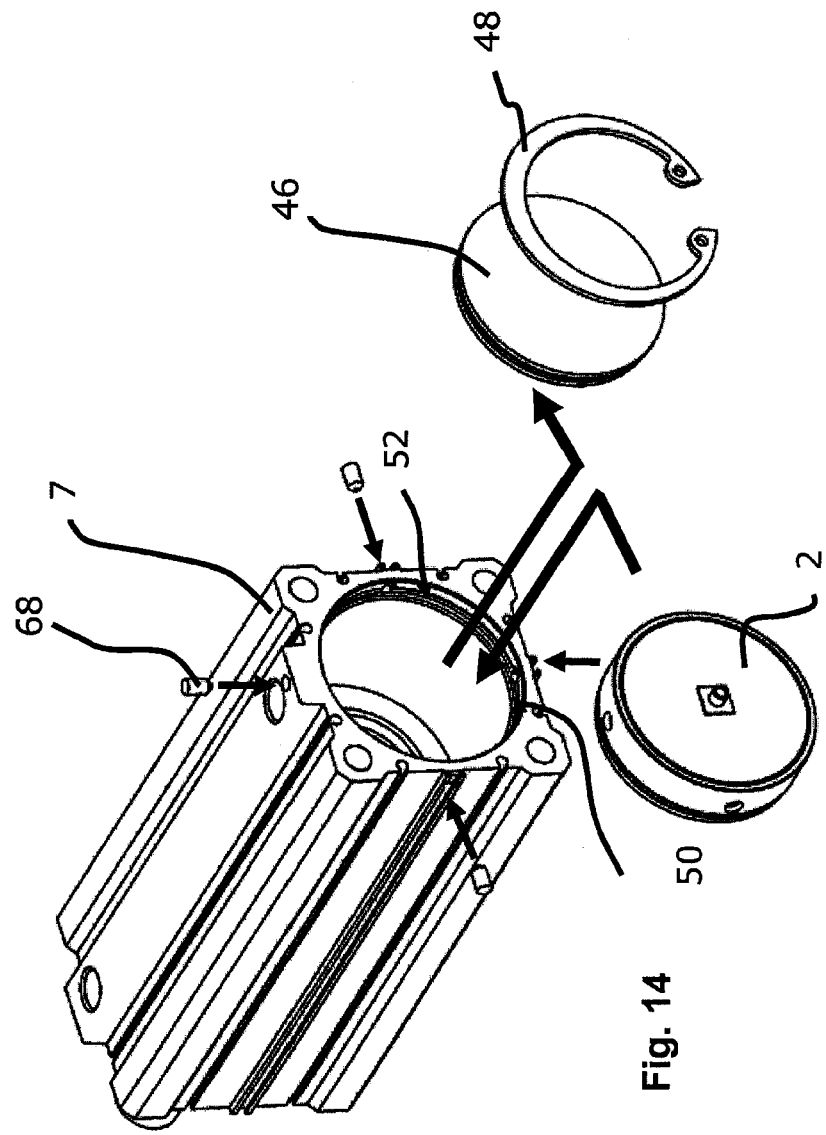
Figure 15:
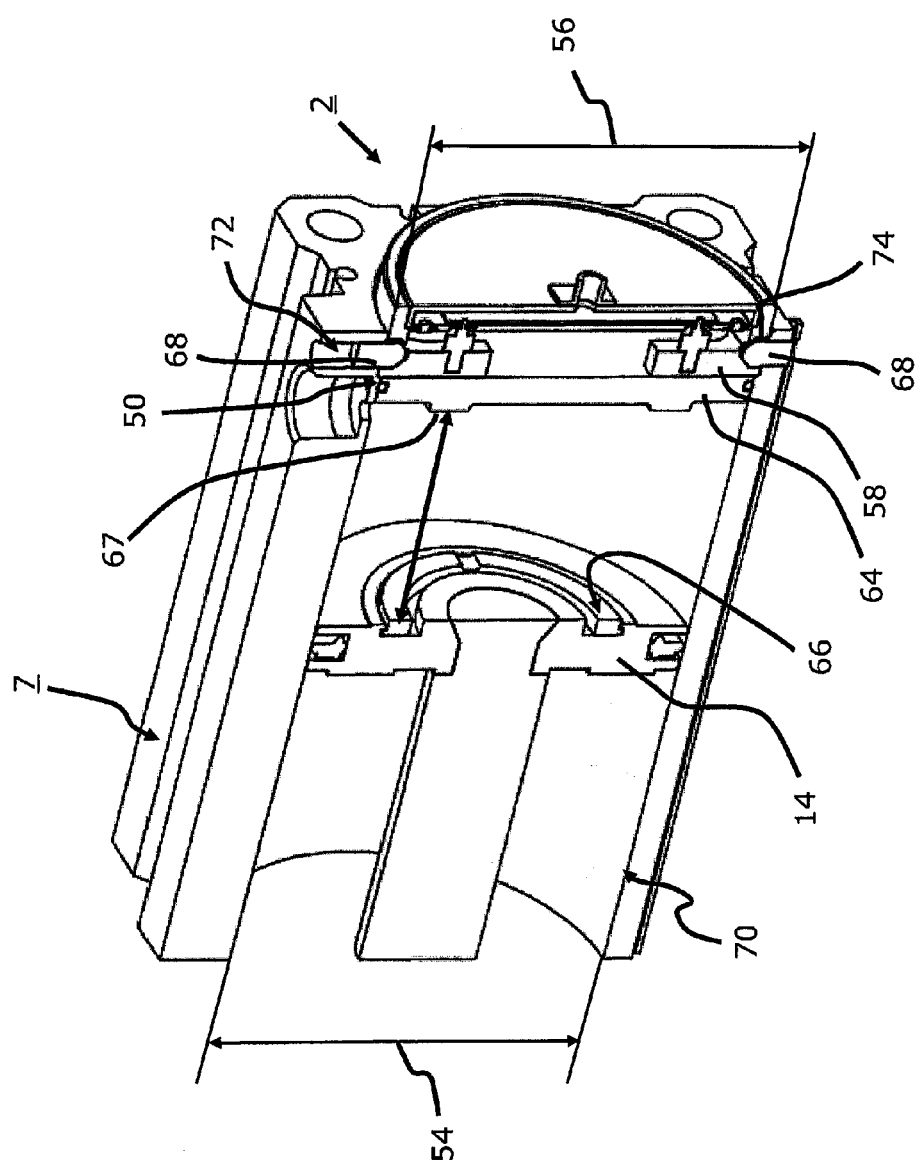
Figure 16:
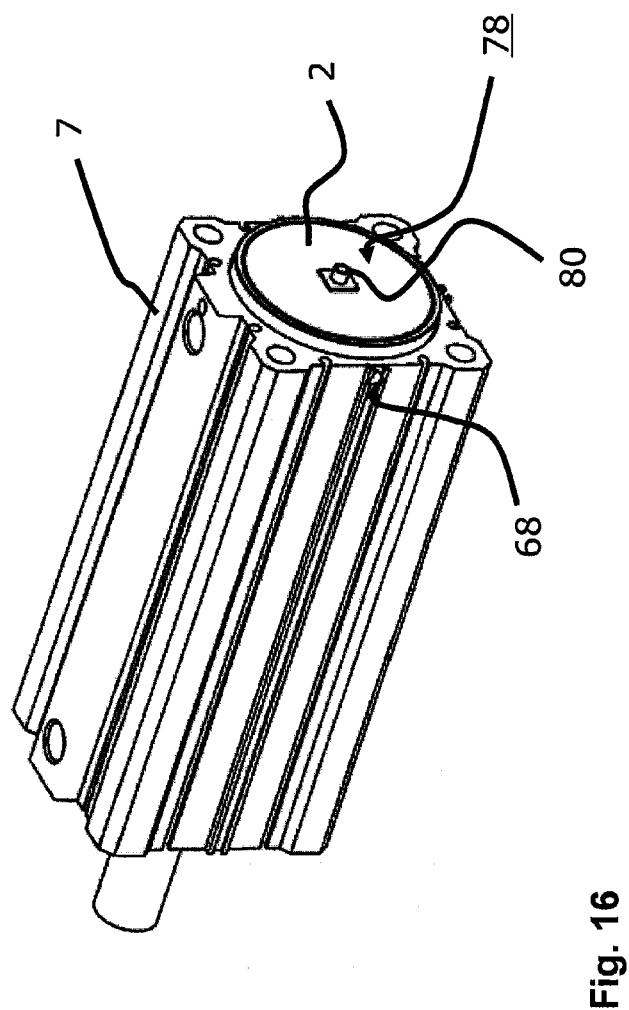
Figure 17:
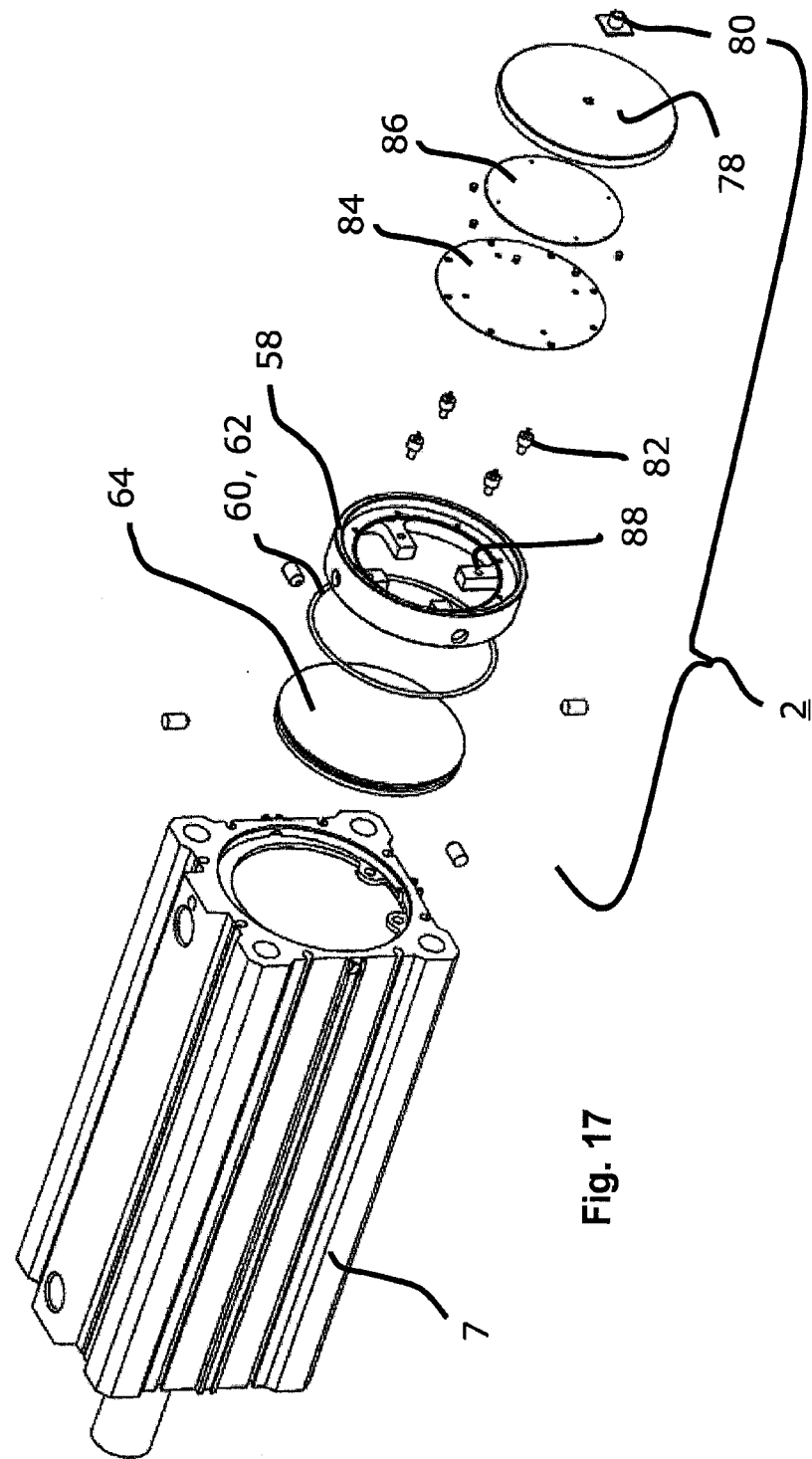

In the following exemplary embodiments of the invention are described in greater detail by means of the drawings. These show as follows:

FIG. 1 a perspective illustration of an embodiment of the distance measuring apparatus with a conduction cross-over with a mode transformer on a cylinder;

FIG. 2A a perspective illustration of embodiments of the distance measuring apparatus with a conduction cross-over with two two-step mode transformers on a cylinder;

FIG. 2B a perspective illustration of embodiments according to FIG. 2A with two three-step mode transformers;

FIG. 2C a perspective illustration of embodiments according to FIG. 2A with two four-step mode transformers;

FIG. 2D a graph for the adaptation of the conduction cross-overs with mode transformers with a different number of steps in the embodiments according to FIGS. 2A, 2B and 2C;

FIG. 3A a perspective illustration of an embodiment of the distance measuring apparatus with a conduction cross-over with two mode transformers offset by 90 degrees in relation to one another on a cylinder;

FIG. 3B a diagrammatic illustration of the conduction cross-over according to the embodiment of FIG. 3A;

FIG. 4A a perspective illustration of an embodiment of the distance measuring apparatus with a conduction cross-over with two mode transformers offset by 180 degrees in relation to one another on a cylinder;

FIG. 4B a diagrammatic illustration of the conduction cross-over according to the embodiment of FIG. 4A for injecting a linearly polarised, electromagnetic wave;

FIG. 5A a perspective illustration of an embodiment of the distance measuring apparatus with a conduction cross-over with four mode transformers offset by 90 degrees in relation to one another on a cylinder;

FIGS. 5B, 5C diagrammatic illustrations of the conduction cross-over according to the embodiment of FIG. 5A for injecting a twice linearly polarised or twice circularly polarised electromagnetic wave;

FIG. 6A a perspective illustration of an embodiment of the distance measuring apparatus with a conduction cross-over with four mode transformers offset by 90 degrees in relation to one another on a cylinder;

FIG. 6B a diagrammatic illustration of the conduction cross-over according to the embodiment of FIG. 6A for injecting a linearly polarised electromagnetic wave in the E01 mode;

FIG. 7A a sectional illustration of an embodiment of the distance measuring apparatus with a conduction cross-over and dielectric disc on a cylinder;

FIG. 7B a graph for the adaptation of the conduction cross-over with a dielectric disc in the embodiment according to FIG. 7A;

FIGS. 8A, 8B a sectional illustration of embodiments of the distance measuring apparatus on a cylinder with a continuous piston rod;

FIGS. 8C, 8D a graph for conduction adaptation when injecting an electromagnetic wave in the TEM mode or in the H11x–H11y modes into the cylinder according to the embodiments shown in FIGS. 8A, 8B;

FIG. 9A a perspective illustration of an embodiment of the distance measuring apparatus on a cylinder with double piston rods;

FIG. 9B a sectional illustration of an embodiment of the distance measuring apparatus on a cylinder with double piston rods;

FIGS. 10A, 10B a sectional illustration of embodiments of the distance measuring apparatus with a conduction cross-over and a collar-shaped dielectric disc on a cylinder;

FIGS. 11A, 11B a sectional illustration of embodiments of the distance measuring apparatus according to FIGS. 10A and 10B, the collar being made of metal;

FIG. 12 an exploded view of an embodiment of a distance measuring apparatus for replacing an end cover on a hollow cylinder;

FIG. 13 a sectional illustration of the embodiment according to FIG. 12 with the distance measuring apparatus inserted into the hollow cylinder and fixed by a clamping ring;

FIG. 14 an exploded illustration of a further embodiment of a distance measuring apparatus for replacing an end cover on a hollow cylinder;

FIG. 15 a sectional illustration of the embodiment according to FIG. 14 with the distance measuring apparatus inserted into the hollow cylinder and fixed by screws onto the hollow cylinder;

FIG. 16 a perspective illustration of the embodiment according to FIG. 15; and FIG. 17 an exploded illustration of the embodiment according to FIG. 15.

The attached drawings illustrate a number of exemplary embodiments, described below, for the arrangement of the mode transformers for generating the different polarisation of the electromagnetic wave and the propagation of the electromagnetic wave according to the phase and amplitude. Parts corresponding to one another are provided with the same reference numbers in all of the figures.

FIG. 1 shows a perspective illustration of an embodiment of the distance measuring apparatus 2 with a conduction cross-over 6 in the form of a mode transformer 4 for injecting a coaxial wave into a linearly polarised hollow conductor wave in the H11 mode into the cylinder 7 by means of the mode transformer 4. A two-step mode transformer 4 and the coaxial injection 8 are shown. Also shown is a double-shell mechanical piston stop 10, 12 which in particular protects the mode transformer 4 from colliding with the piston 14.

FIGS. 2A, 2B and 2C show different embodiments of the distance measuring apparatus with a conduction cross-over 6 in the form of an inductive mode transformer 4. As the number of transformation steps increases, the adaptation improves (FIG. 2D). A two- (16), three- (18) and four-step (20) mode transformer 4 are shown (FIGS. 2A, 2B and 2C).

FIG. 3A shows a perspective illustration of an embodiment of the distance measuring apparatus 2 with a conduction cross-over 6 with two mode transformers 4 offset by 90 degrees in relation to one another for the parallel injection of a coaxial wave and the transformation into two linearly polarised hollow conductor waves (horizontal and vertical) in the H11 mode. The two mode transformers 4 are arranged mechanically offset by 90 degrees over a circular path of a circle provided in the end section of the cylinder 7.

FIG. 3B shows a diagrammatic illustration of the conduction cross-over with a 3 dB coupling and a phase difference of 90 degrees between the electromagnetic waves according to the embodiment of FIG. 3A.

The arrangement shown in FIG. 3A is also used in order to generate a circularly polarised wave. The injection then takes place, however, with two waves shifted by 90 or 180 degrees in the phase.

FIG. 4A shows a perspective illustration of an embodiment of the distance measuring apparatus 2 with a conduction cross-over 6 with two mode transformers 4 offset by 180 degrees in relation to one another on a cylinder 7 for the injection of a coaxial wave and transformation into a linearly polarised hollow conductor wave in the H11 mode. The injection of the wave takes place in two mode transformers 4 which are arranged mechanically offset by 180 degrees.

The waves injected onto the mode transformers 4 additionally have a phase shift of 180 degrees, as additionally illustrated diagrammatically in FIG. 4B.

FIG. 5A shows a perspective illustration of an embodiment of the distance measuring apparatus 2 with a conduction cross-over 6 with four mode transformers 4 offset by 90 degrees in relation to one another on a cylinder 7 for the injection of a coaxial wave and the transformation into two linearly polarised hollow conductor waves or into one or two circularly polarised hollow conductor wave/s respectively in the H11 mode. injection of the electromagnetic wave takes place in four mode transformers 4 which are respectively offset mechanically by 90 degrees. The double linear injection is generated here in that for example the vertically polarised wave is fed into the mode transformer 4 at 0 degrees (A) and 180 degrees (B) with a phase shift of 180 degrees, and the horizontally polarised wave into the mode transformer 4 at 90 degrees (C.) and 270 degrees (D) with a phase shift of 180 degrees (FIG. 5B).

The singly and doubly circularly polarised wave is generated in that by means of four mode transformers arranged over a circular path of a circle the electromagnetic wave is injected e.g. in the clockwise direction with a phase shift of 90 degrees (FIG. 5C).

FIG. 6A shows a perspective illustration of an embodiment of the distance measuring apparatus 2 with a conduction cross-over 6 with four mode transformers 4 offset by 90 degrees in relation to one another on a cylinder 7 for the injection of a coaxial wave and the transformation into a linearly polarised wave in the E01 mode. The injection takes place in phase (FIG. 6B) with all four mode transformers 4 which are arranged mechanically respectively offset by 90 degrees.

FIG. 7A shows a sectional illustration of an embodiment of the distance measuring apparatus 2 with a conduction cross-over 6 and a dielectric disc 22 on a cylinder 7, the conduction cross-over 6 having one-step mode transformers 4. The dielectric disc 22 is fitted in the uncoupling region of the hollow conductor wave. By means of the higher dielectricity number of the dielectric disc 22 compared with air a shortening of the swing-in path of the electromagnetic wave in the desired mode, e.g. H11 mode, takes place. At the same time the dielectric disc 22 can be used as a mechanical stop for the piston (not shown in FIG. 7A). The configuration leads to an extremely short design, in particular of the conduction cross-over, with one-step mode transformers.

In FIG. 7B the S parameters of the arrangement according to FIG. 7A are shown graphically. In the example shown a better adaptation than 20 dB is achieved for a frequency range of 3.8 GHz to 4.15 GHz (see S11 curve, 24).

FIGS. 8A and 8B show a sectional illustration of embodiments of the distance measuring apparatus 2 on a cylinder 7 with the functional principle of the continuous piston rod 26. For this embodiment too the proposed inductive mode transformer 4 can be used. For this coaxial hollow conductor system, however, the TEM mode 28 (FIG. 8C) is preferably stimulated, by taking into account slight power losses with regard to the adaptation it also being possible to stimulate the H11 mode 30 (FIG. 8D).

FIGS. 9A and 9B show in a perspective illustration and in a sectional illustration embodiments of the distance measuring apparatus 2 on a cylinder 7 with double piston rods 32, 34. Here two or more piston rods 32, 34 run into one another and independently of one another. By combining the functional principles the piston position of the totally inwardly running piston 36 can be detected with a system from FIGS. 2 to 7, and that of the outer pistons 38 with an arrangement from FIGS. 8A and 8B independently of one another. In FIG. 9B the double piston system is shown by an inner piston 36 and an outer piston 38.

FIGS. 10A and 10B show a sectional illustration of embodiments of the distance measuring apparatus 2 with a conduction cross-over 6 and a hat- or collar-shaped dielectric disc 40 on a cylinder 7. There is located in the tubular inner region 42 a seal 44 moveable in the x direction. With this arrangement it is possible to realise pneumatic end cushioning.

FIGS. 11A and 11B show a sectional illustration of embodiments of the distance measuring apparatus 2 according to FIGS. 10A and 10B, the hat or collar acting as a damping tube (tubular inner region 42) being made of metal.

In order to continuously be able to measure the distance between the piston and the sensor the transmission signal must be modulated. This can take place in the form of a frequency modulation. In order to achieve a high distance resolution here a large frequency deviation is required, however. In practice it is more advantageous to transmit a CW signal, e.g. at different frequencies, in order to determine a clear distance range (ambiguity function!) with a respective subsequent analysis of the phase difference between the transmission and receipt signal as a highly accurate measured value for the distance between the sensor and the measuring piston. The number of frequencies to be used and the position of the latter is dependent first and foremost upon the maximum distance to be measured and upon the required error tolerance in relation to the phase angle measurement. In general, with a small frequency difference between two measuring frequencies the maximum measurable distance is greater, however the differentiation between two consecutive periods requires greater accuracy of the phase angle measurement than with a greater frequency difference. Therefore the interference resistance is higher with greater differences between the individual measured differences.

If a large measurement range with sufficient interference resistance is measured, a number of measuring frequencies with a suitable frequency position are required. In this way pairs of frequencies both with a small difference in the transmitting frequency (large measuring range) and with a large frequency difference (interference resistance) are required. The position accuracy is substantially determined by the precision of the phase angle measurement with the highest measuring frequency because the wavelength is the smallest here. The following formula applies:

path change=phase angle change×wavelength/180 degrees.

A considerable improvement to the measuring accuracy can moreover be achieved if a number of signals with different polarisation are analysed. Thus an electromagnetic wave with horizontal and one with vertical polarisation can be stimulated at the same time if e.g. two mode transformers are provided 90 degrees apart. The analysis of a circularly polarised electromagnetic wave has proven to be even more advantageous. If one transmits e.g. a left-circular wave, the latter is reflected on the piston (total reflection) and changes the polarisation direction upon the basis of the phase jump of 180 degrees. The injected left-circular wave is received as a right-circular wave. However, interference echoes maintain the direction of rotation and are received as a left-circular wave. By means of a feed network, for example a branch line coupler, both signals are decoupled as a horizontally or vertically polarised wave and further processed. The interference echoes then appear e.g. in the receiving channel of the vertically polarised wave, whereas the useful information (=piston position) appears in the receiving channel of the horizontally polarised wave.

In FIG. 12 a further embodiment of a distance measuring apparatus 2 is shown with which an end cover 46 acting as the conductor termination is replaced on the hollow cylinder 7. The end cover 48 fixed between a clamping ring 48 and a ledge 40 provided on the hollow cylinder 7 can be removed from the hollow cylinder 7 by releasing the clamping ring 48 from a notch 52 provided on the hollow cylinder 7. Then the distance measuring apparatus 2 can be inserted without any further adaptations to the distance measuring apparatus 2 or to the hollow cylinder 7 into the latter up to the ledge 50 as a stop and be fixed by the clamping ring 52. In order to stop the distance measuring apparatus 2 on the ledge 50 of the hollow cylinder 7 the diameter of the distance measuring apparatus 2 is correspondingly dimensioned.

FIG. 13 shows a sectional illustration of the embodiment according to FIG. 12 with the distance measuring apparatus 2 inserted into the hollow cylinder 7 and fixed by the clamping ring 52. On the piston side the distance measuring apparatus 2 strikes the ledge 50 of the hollow cylinder 7 because an internal diameter 54 of the hollow cylinder 7 on the ledge 50 has dimensions smaller than an external diameter 56 of a metal body 58. In order to seal the cavity between the piston 14 and the distance measuring apparatus 2 two seals 60, 62 are provided on the latter, the seal 60 facing towards the piston 14 acting as a pressure seal, and the seal 62 facing away from the piston 14 acting as a high frequency seal. For the pneumatic damping of the piston 14 and in order to prevent the piston 14 and a dielectric outer disc 64 disposed on the distance measuring apparatus 2 from colliding, a damping element 66, which co-operates with a ledge 67 provided on the dielectric outer disc 64, is provided at the very least on the piston 14.

In FIG. 14 a further embodiment of a distance measuring apparatus 2 is shown with which an end cover 46 acting as a conductor termination is replaced on the hollow cylinder 7. The end cover 48 fixed between the clamping ring 48 and the ledge 50 provided on the hollow cylinder 7 can be removed from the hollow cylinder 7 by detaching the clamping ring 48 from the notch 52 provided on the hollow cylinder 7. Next the distance measuring apparatus 2 can be inserted into the hollow cylinder 7 without any further adaptations to the distance measuring apparatus 2 or to the hollow cylinder 7 up to the ledge 50 as a stop, and in the present exemplary embodiment fixed by locking screws 68.

FIG. 15 shows a sectional illustration of the embodiment according to FIG. 14 with the distance measuring apparatus 2 inserted into the hollow cylinder 7 and fixed by the locking screws 68. On the piston side the distance measuring apparatus 2 strikes the ledge 50 of the hollow cylinder 7 since the internal diameter 54 of the hollow cylinder 7 is smaller on the ledge 50 than the external diameter 56 of the metal body 58. For the pneumatic damping of the piston 14 and in order to prevent the piston 14 and the dielectric outer disc 64 disposed on the distance measuring apparatus 2 from colliding the damping element 66 is provided at the very least on the piston 14, and said damping element co-operates with the ledge 67 provided on the dielectric outer disc 64. In the present exemplary embodiment locking of the distance measuring apparatus 2 within the hollow cylinder 7 is realised by the locking screws 68. Alternatively, or in combination, locking pins can also be used. In the present exemplary embodiment the locking screws 68 are arranged over a circular path following the inner jacket 70 of the hollow cylinder 7, offset at an angle of 90 degrees in relation to one another (FIG. 17) and sunk into bore holes 72 provided in the hollow cylinder 7 and into indentations 74 provided in the distance measuring apparatus 2 which lie opposite the bore holes 72 in the end-mounted distance measuring apparatus 2, and fixed by screw connections.

FIG. 16 shows a perspective illustration of the embodiment according to FIG. 14 with the distance measuring apparatus 2 inserted into the hollow cylinder 7 and fixed by the locking screws 68. The distance measuring apparatus 2 forming the conductor termination of the hollow cylinder 7 ends on the side facing away from the hollow cylinder 7 with an end disc 78 and a terminal 80 for electrical contacting of the distance measuring apparatus 2.

FIG. 17 shows the embodiment according to FIG. 15 in an exploded illustration, in particular of the distance measuring apparatus 2 which ends at a side facing towards the hollow cylinder 7 with the dielectric outer disc 64, and in the direction of the side facing away from the hollow cylinder 7 comprises the sealing ring 60, 62, the metal body 58, coaxial feedthroughs 82, a disc 84, a board 86 having the electronics, as well as the end disc 78 and the terminal 80. The injection of the electromagnetic waves takes place by means of the coaxial feedthroughs 82 connected with electrical conductivity to the electronics on the board 86 and to the metal body 58 via ledges 88 provided on the latter.

In general it should be established that the measuring method which relates to the inductive feed can also be used for a capacitive feed.

The invention claimed is:

1. A distance measuring apparatus for determining a distance between a body in a conducting structure and an injection location at which electromagnetic waves are injected into the conducting structure, the distance measuring apparatus comprising:
   a signal source for generating the electromagnetic waves;
   a conduction cross-over at the injection location for coaxially-inductive coupling the signal source the conducting structure in order to inject an electromagnetic wave into the conducting structure and to decouple and receive the electromagnetic wave reflected from the body, orthogonally polarized electromagnetic waves being received simultaneously; and
   a device configured to calculate a distance between the injection point and the body from the phase difference between the injected electromagnetic wave and the decoupled electromagnetic wave,
   wherein the conduction cross-over comprises one or more conductive, inductive mode transformers that are configured to inject the electromagnetic wave, and the signal source generates the electromagnetic waves by in phase injection of a coaxial wave into the conducting structure by the one or more conductive, inductive mode transformers.

2. The distance measuring apparatus of claim 1, wherein the conducting structure comprises a hollow cylinder.

3. The distance measuring apparatus of claim 2, wherein the hollow cylinder is a pneumatic cylinder, a hydraulic cylinder, or a measuring cylinder.

4. The distance measuring apparatus of claim 2, further comprising a piston in the hollow cylinder corresponding to the body.

5. The distance measuring apparatus of claim 4, further comprising a piston stop positioned between the piston and the conduction cross-over along an axis of the hollow cylinder.

6. The distance measuring apparatus of claim 1, further comprising a signal source in communication with the injection location, the signal source being configured to inject an electromagnetic wave having a frequency in a range between 1 MHz and 100 GHz into the conducting structure.

7. The distance measuring apparatus of claim 6, wherein the electromagnetic wave is a monomodal electromagnetic wave.

8. The distance measuring apparatus of claim 7, wherein the monomodal electromagnetic wave is an H11 mode, an E01 mode, or a TEM mode.

9. The distance measuring apparatus of claim 1, wherein the one or more conductive, inductive mode transformers comprises two conductive, inductive mode transformers arranged offset by 180 degrees in relation to one another over a circular path proximate to the injection location.

10. The distance measuring apparatus of claim 1, wherein the one or more conductive, inductive mode transformers comprises two conductive, inductive mode transformers arranged offset by 90 degrees in relation to one another over a circular path proximate to the injection location.

11. The distance measuring apparatus of claim 1, wherein the one or more conductive, inductive mode transformers comprises four conductive, inductive mode transformers arranged offset by 90 degrees in relation to one another over a circular path proximate to the injection location.

12. The distance measuring apparatus of claim 1, wherein the one or more conductive, inductive mode transformers are configured to inject linearly polarized electromagnetic waves.

13. The distance measuring apparatus of claim 1, wherein the one or more conductive, inductive mode transformers are each shaped as a mechanical stairway.

14. The distance measuring apparatus of claim 13, wherein each mechanical stairway is arranged with a decreasing step height in the direction of the body.

15. The distance measuring apparatus of claim 1, wherein the conduction cross-over comprises for the coupling of the transmitting and receiving device to the conducting structure, a contact between each respective mode transformer and a coaxial inner conductor.

16. A distance measuring apparatus for determining a distance between a body in a conducting structure comprising a hollow cylinder and an injection location at which electromagnetic waves are injected into the conducting structure, the distance measuring apparatus comprising:
a signal source for generating the electromagnetic waves;
a conduction cross-over at the injection location for coaxially-inductive coupling the signal source the conducting structure in order to inject an electromagnetic wave into the conducting structure and to decouple and receive the electromagnetic wave reflected from the body, orthogonally polarized electromagnetic waves being received simultaneously; and
a device configured to calculate a distance between the injection point and the body from the phase difference between the injected electromagnetic wave and the decoupled electromagnetic wave,
wherein the conduction cross-over comprises one or more transformers each shaped as a mechanical stairway arranged on an inner wall of the hollow cylinder.

17. The distance measuring apparatus of claim 16, wherein the transformers are shaped with a decreasing stair height in a direction extending along a cylindrical axis of the hollow cylinder.

* * * * *